(12) United States Patent
Baarman et al.

(10) Patent No.: US 6,885,114 B2
(45) Date of Patent: Apr. 26, 2005

(54) MINIATURE HYDRO-POWER GENERATION SYSTEM

(75) Inventors: David W. Baarman, Fennville, MI (US); Terry L. Lautzenheiser, Nunica, MI (US)

(73) Assignee: Access Business Group International, LLC, Ada, MI (US)

( * ) Notice: Subject to any disclaimer, the term of this patent is extended or adjusted under 35 U.S.C. 154(b) by 0 days.

(21) Appl. No.: 10/683,020

(22) Filed: Oct. 9, 2003

(65) Prior Publication Data

US 2004/0195840 A1 Oct. 7, 2004

Related U.S. Application Data

(63) Continuation-in-part of application No. 09/680,345, filed on Oct. 5, 2000, now Pat. No. 6,798,080.
(60) Provisional application No. 60/417,337, filed on Oct. 9, 2002.

(51) Int. Cl.[7] .................................. F03B 13/10
(52) U.S. Cl. ................. 290/43; 290/54; 290/52; 239/380; 239/385; 239/256.11; 239/256.43
(58) Field of Search ................. 290/43, 52, 54; 239/256.11, 256.43, 380–389

(56) References Cited

U.S. PATENT DOCUMENTS

| 692,714 | A | 2/1902 | Sala et al. | |
|---|---|---|---|---|
| 1,560,535 | A | 11/1925 | Burton | |
| 2,436,683 | A | 2/1948 | Wood, Jr. | |
| 2,663,541 | A | 12/1953 | Geen | 253/3 |
| 2,743,375 | A | 4/1956 | Parker | 290/52 |
| 3,233,164 | A | 2/1966 | Tyler | 322/28 |
| 3,551,091 | A | 12/1970 | Veloz | 21/102 |
| 3,845,291 | A | 10/1974 | Portyrata | 240/26 |
| 3,913,399 | A | 10/1975 | Sheeks | 73/229 |

(Continued)

*Primary Examiner*—Nicholas Ponomarenko
*Assistant Examiner*—Iraj A. Mohandesi
(74) *Attorney, Agent, or Firm*—Brinks Hofer Gilson & Lione

(57) ABSTRACT

A miniature hydro-power generation system may produce electric power from a flow of liquid. The miniature hydro-power generation system may include a housing that includes a plurality of paddles positioned to extend outwardly from an outer surface of the housing. The system may also include a nozzle and a centering rod extending through the housing. The housing may rotate around the centering rod when a stream of liquid from the nozzle is directed at the paddles. A generator that includes a rotor and a stator may be positioned within a cavity of the housing. The rotor may be coupled with the housing and the stator may be coupled with the centering rod. The rotor may rotate around the stator at high RPM to generate electric power when the housing rotates. The electric power may supply a load and/or may be stored in an energy storage device.

39 Claims, 21 Drawing Sheets

U.S. PATENT DOCUMENTS

| | | | |
|---|---|---|---|
| 3,923,663 A | 12/1975 | Reid .......................... 210/443 |
| 3,938,905 A | 2/1976 | Wadensten ................. 415/119 |
| 4,101,777 A | 7/1978 | Reid .......................... 250/436 |
| 4,177,532 A | 12/1979 | Azuma ........................... 15/24 |
| 4,246,753 A | 1/1981 | Redmond .................... 60/398 |
| 4,272,686 A | 6/1981 | Suzuki ........................ 290/54 |
| 4,276,482 A | 6/1981 | Crockett ..................... 290/52 |
| 4,293,777 A | 10/1981 | Gamell ........................ 290/52 |
| 4,352,025 A | 9/1982 | Troyen ........................ 290/54 |
| 4,392,063 A | 7/1983 | Lindquist .................... 290/54 |
| 4,393,991 A | 7/1983 | Jeffras et al. ............... 239/102 |
| 4,467,217 A | 8/1984 | Roussey ...................... 290/54 |
| 4,520,516 A | 6/1985 | Parsons ......................... 4/823 |
| 4,524,285 A | 6/1985 | Rauch .......................... 290/43 |
| 4,564,889 A | 1/1986 | Bolson ....................... 362/192 |
| 4,586,871 A | 5/1986 | Glass ........................... 415/90 |
| 4,613,279 A | 9/1986 | Corren et al. ................... 415/2 |
| 4,615,799 A | 10/1986 | Mortensen ................. 210/117 |
| 4,676,896 A | 6/1987 | Norton ....................... 210/192 |
| 4,731,545 A | 3/1988 | Lerner et al. |
| 4,740,711 A | 4/1988 | Sato et al. .................... 249/52 |
| 4,746,808 A | 5/1988 | Kaeser ........................ 290/52 |
| 4,752,401 A | 6/1988 | Bodenstein ................ 210/746 |
| 4,769,131 A | 9/1988 | Noll et al. .................... 210/85 |
| 4,857,204 A | 8/1989 | Joklik ......................... 210/695 |
| 4,868,408 A | 9/1989 | Hesh ........................... 290/43 |
| 4,909,931 A | 3/1990 | Bibi ............................ 210/85 |
| 4,920,465 A | 4/1990 | Sargent ....................... 362/96 |
| 4,923,368 A | 5/1990 | Martin ....................... 415/202 |
| 4,950,130 A | 8/1990 | Erlach ........................ 415/202 |
| 4,963,780 A | 10/1990 | Hochstrasser .............. 310/104 |
| 4,968,437 A | 11/1990 | Noll et al. .................. 210/748 |
| 4,971,687 A | 11/1990 | Anderson .................... 210/85 |
| 4,973,408 A | 11/1990 | Keefer ....................... 210/652 |
| 5,040,945 A | 8/1991 | Levesque .................... 290/52 |
| 5,043,592 A | 8/1991 | Hochstrasser ............... 290/52 |
| 5,069,782 A | 12/1991 | Moyher, Jr. et al. ........ 210/192 |
| 5,100,290 A | 3/1992 | Berger ........................ 415/60 |
| 5,102,296 A | 4/1992 | Kimberlin .................. 415/186 |
| 5,118,961 A | 6/1992 | Gamell ........................ 290/52 |
| 5,140,254 A | 8/1992 | Katzman |
| 5,230,792 A | 7/1993 | Sauska et al. ................ 210/97 |
| 5,249,923 A | 10/1993 | Negus ........................ 415/202 |
| 5,263,814 A | 11/1993 | Jang ............................ 415/63 |
| 5,266,215 A | 11/1993 | Engelhard ................... 210/748 |
| 5,344,558 A | 9/1994 | Kool ........................... 210/117 |
| 5,349,985 A * | 9/1994 | Fischer ....................... 137/607 |
| 5,445,729 A | 8/1995 | Monroe et al. ............... 210/86 |
| 5,536,395 A | 7/1996 | Kuennen et al. ............. 210/87 |
| 5,540,848 A | 7/1996 | Engelhard ................... 210/748 |
| 5,547,590 A | 8/1996 | Szabo ........................ 210/748 |
| 5,644,170 A | 7/1997 | Bynum et al. ................ 290/43 |
| 5,659,205 A | 8/1997 | Weisser ....................... 290/52 |
| 5,780,860 A | 7/1998 | Gadgil et al. ............... 250/432 |
| 5,793,130 A | 8/1998 | Anderson .................... 310/50 |
| 5,820,339 A | 10/1998 | Trojahn ..................... 415/202 |
| 5,843,309 A | 12/1998 | Mancil ....................... 210/205 |
| 5,853,572 A | 12/1998 | Kuennen et al. ............. 210/87 |
| 5,947,678 A | 9/1999 | Bergstein |
| 5,982,059 A | 11/1999 | Anderson .................... 310/50 |
| 6,011,334 A | 1/2000 | Roland ........................ 310/86 |
| 6,012,474 A | 1/2000 | Takamoto et al. ............ 137/14 |
| 6,036,333 A * | 3/2000 | Spiller ........................ 362/192 |
| 6,073,445 A | 6/2000 | Johnson ....................... 60/612 |
| 6,120,691 A | 9/2000 | Mancil ....................... 210/748 |
| 6,139,750 A | 10/2000 | Graham ...................... 210/652 |
| 6,196,793 B1 | 3/2001 | Braaten ...................... 415/191 |
| 6,208,037 B1 | 3/2001 | Mayo, Jr. et al. ............ 290/54 |
| 6,309,179 B1 | 10/2001 | Holden ....................... 415/202 |
| 6,375,842 B1 | 4/2002 | Graham ................. 210/321.74 |
| 6,436,299 B1 | 8/2002 | Baarman et al. ............ 210/748 |
| 6,443,697 B1 | 9/2002 | Rossi et al. ................. 415/202 |
| 6,798,080 B1 * | 9/2004 | Baarman et al. .............. 290/43 |
| 2002/0041100 A1 | 4/2002 | Yumita et al. ................ 290/52 |
| 2002/0047374 A1 | 4/2002 | Yumita ........................ 310/81 |
| 2002/0113442 A1 | 8/2002 | Yumita ........................ 290/54 |
| 2002/0122720 A1 | 9/2002 | Esa ............................ 415/169 |

* cited by examiner

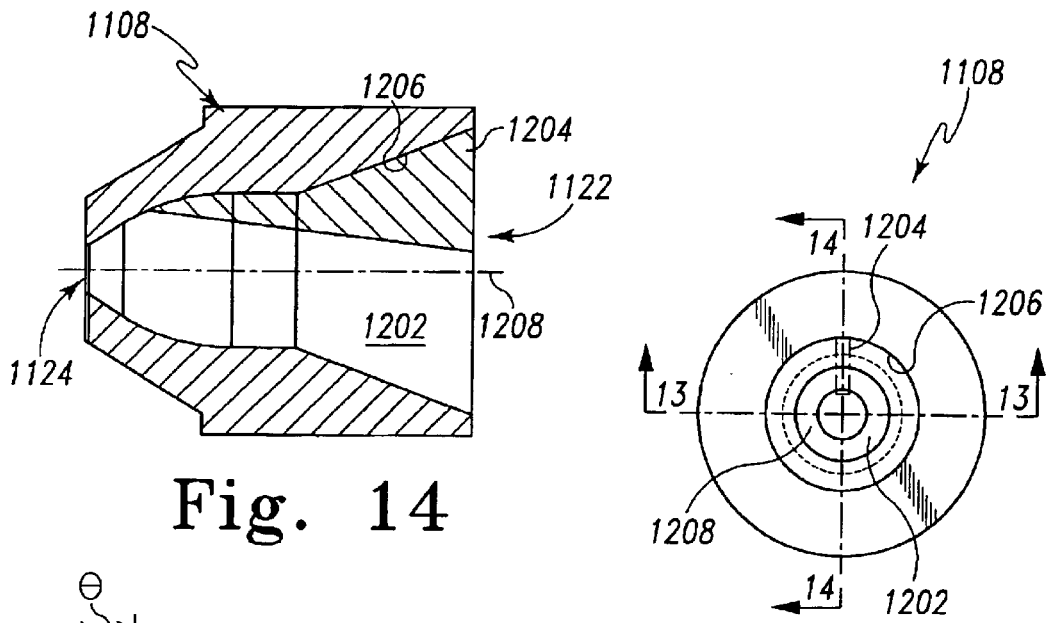
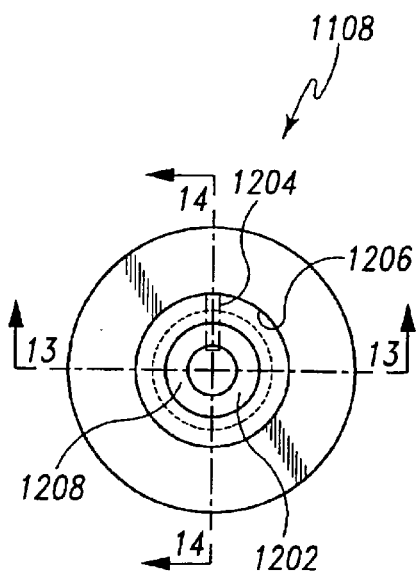
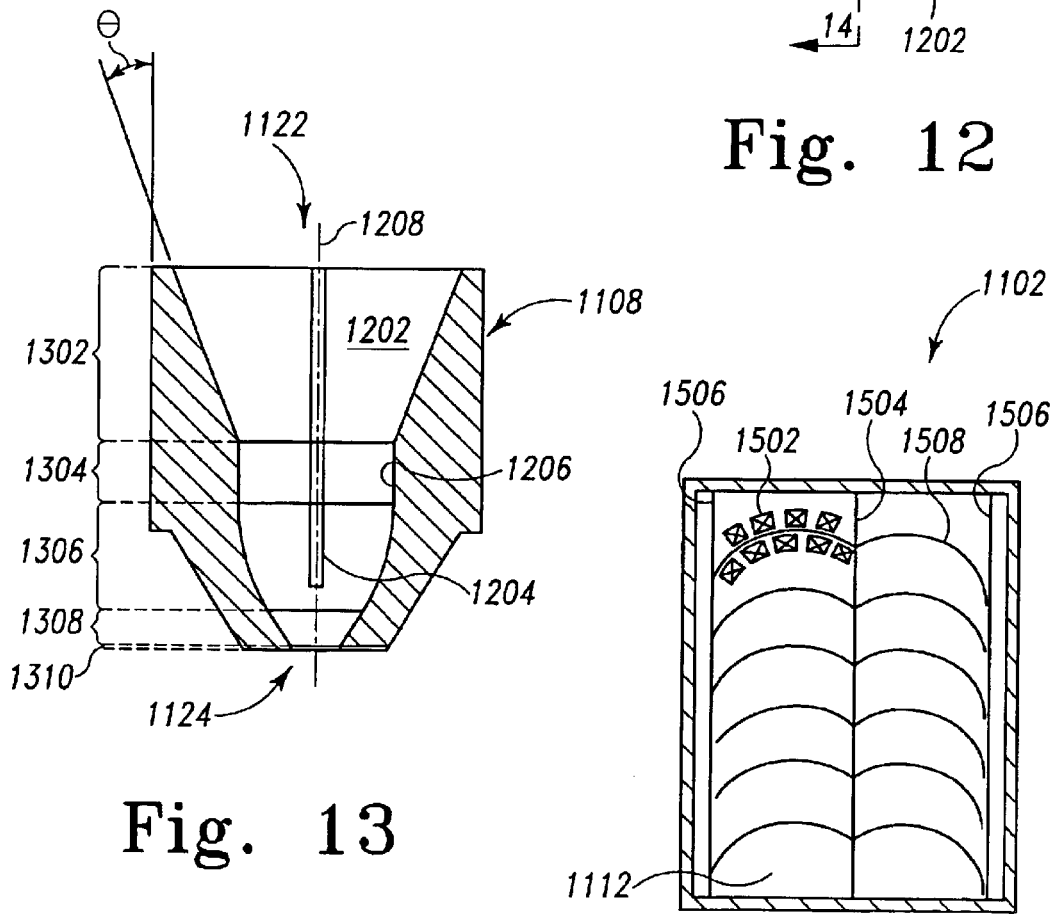
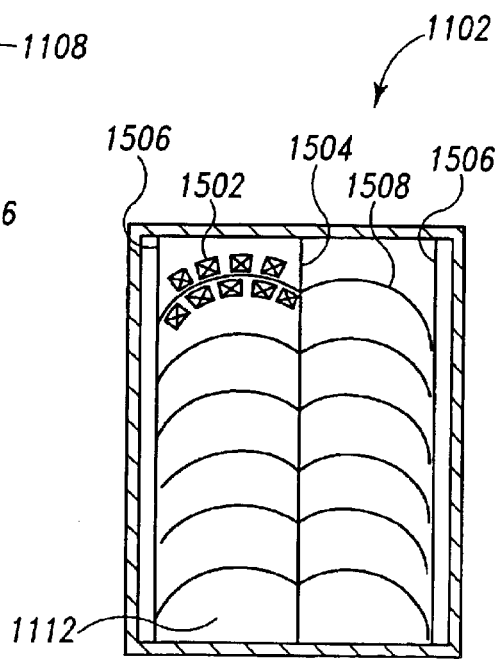
Fig. 14
Fig. 12
Fig. 13
Fig. 15

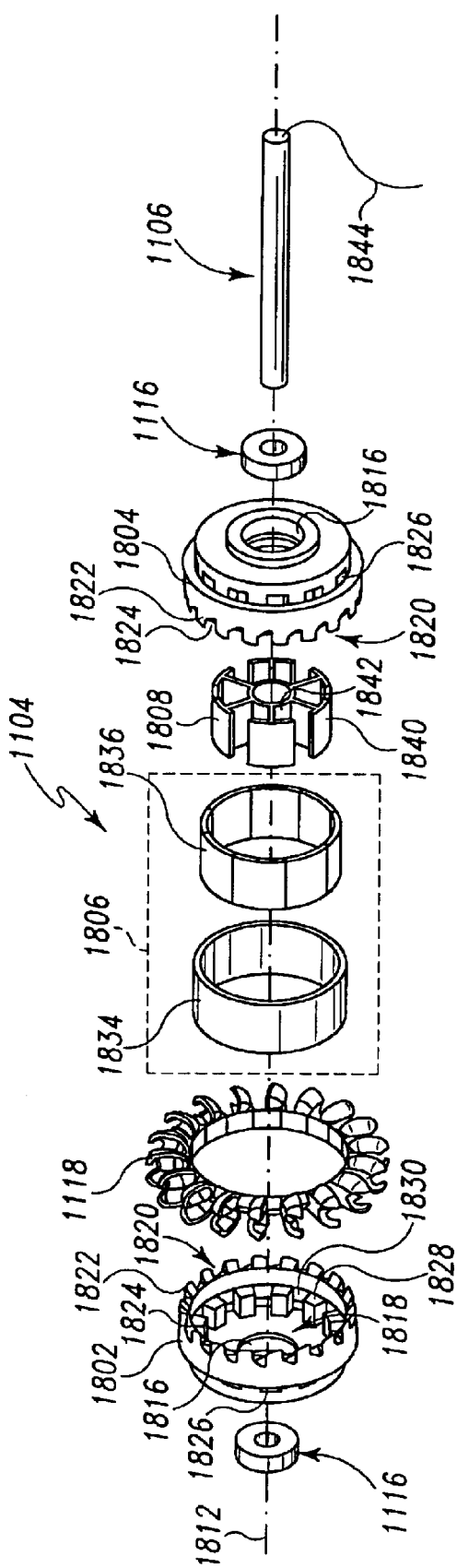
Fig. 18
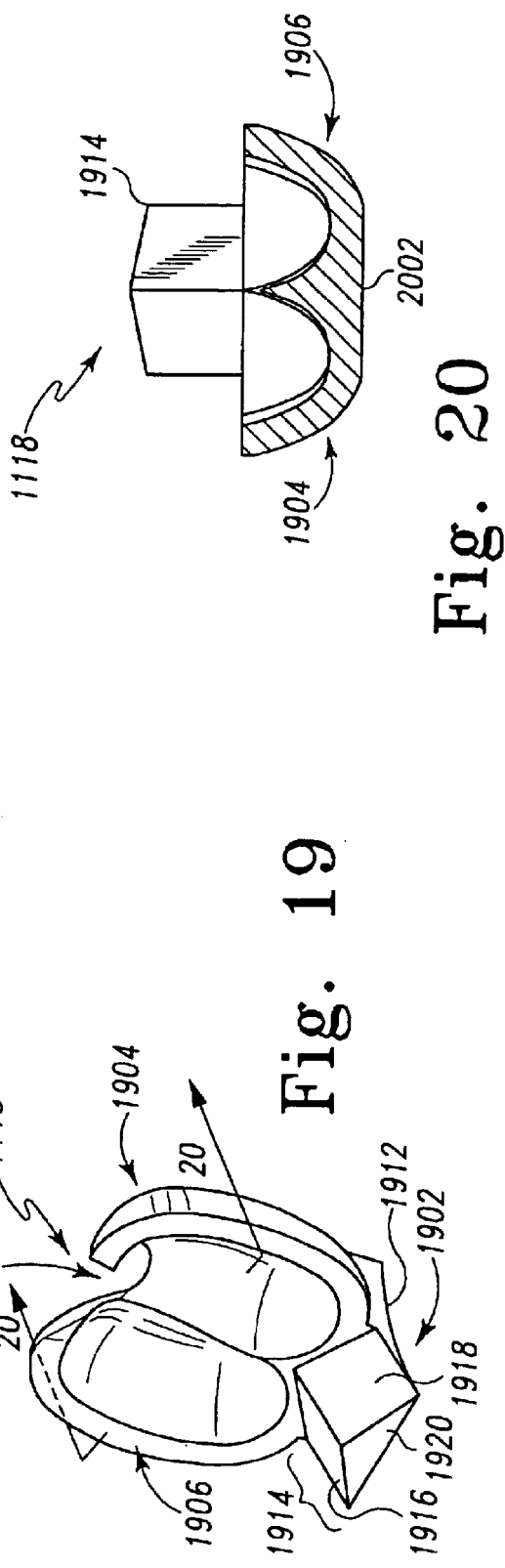
Fig. 19
Fig. 20

MINIATURE HYDRO-POWER GENERATION SYSTEM

This application claims the benefit under 35 U.S.C. §119(e) of Provisional U.S. patent application Ser. No. 60/417,337, filed on Oct. 9, 2002, which is herein incorporated by reference. In addition, this application is a continuation-in-part of U.S. patent application Ser. No. 09/680,345, filed on Oct. 5, 2000, now U.S. Pat. No. 6,798,080, issued Sep. 28, 2004, which claims the benefit of U.S. provisional patent application Ser. No. 60/157,760, filed on Oct. 5, 1999.

FIELD OF THE INVENTION

The present invention relates generally to electric power generation and, more particularly, to hydroelectric power generation with a miniature hydro-power generation system.

BACKGROUND OF THE INVENTION

Hydro-electric power generation in which kinetic energy is extracted from flowing pressurized water and used to rotate a generator to produce electric power is known. In addition, use of other pressurized fluids such as gas, steam, etc, to rotate a generator is known. With large hydro-electric power generation operated with a large-scale water source such as a river or dam, thousands of megawatts of power may be generated using millions of gallons of flowing water. As such, conversion of the kinetic energy in the flowing water to electric power may include significant inefficiencies and yet still provide an economical and acceptable level of performance.

As the size of the hydro-electric power generation equipment becomes smaller, the magnitude of electric power produced also becomes smaller. In addition, the amount of flowing water from which kinetic energy may be extracted becomes less. Thus, efficiency of the conversion of the kinetic energy in the flow of water to electric power becomes significant. When there are too many inefficiencies, only small amounts of kinetic energy is extracted from the pressurized flowing water. As a result, the amount of electric power produced diminishes as the size of the hydro-electric power generation equipment becomes smaller.

There are many small scale systems that include flowing pressurized liquid and require electric power to operate. Some examples include residential water treatment systems, automatic plumbing fixtures, flow rate monitors, water testing equipment, etc.

There are several different types of water treatment systems that include a carbon-based filter unit and an ultraviolet (UV) light unit to filter and decontaminate the water before being dispensed for consumption. The carbon-based filter unit uses inert material to filter out particulate and organic contaminants. Ultraviolet radiation that is emitted from the ultraviolet light unit is used to neutralize harmful microorganisms present in the water.

In order to energize the ultraviolet light unit and any other electric power consuming systems that may be in the water treatment system, a power source is required. Conventional water treatment systems use power from a standard electrical outlet or a battery power source to provide the energy necessary to drive all of the components in the water treatment system, including the ultraviolet light unit. In the case of water treatment systems powered by electrical outlets, the system has limited portability and ceases to operate when there is an interruption in the electrical outlet power supply.

Water treatment systems operated from battery power sources contain only a finite supply of energy that is depleted through operation or storage of the water treatment system. In addition, replacement batteries must be readily available to keep the water treatment system operable. If a longer-term battery power source is desired, larger batteries are required that can add considerable weight and size to the water treatment system.

Some existing water treatment systems are capable of using either the standard electrical outlets or the battery power sources where the battery power source can be replenished by the electrical outlet power source. Although these water treatment systems do not require replacement batteries, the capacity and size of the batteries dictate the length of operation of the water treatment system while operating on the battery source. An electrical outlet source must also be utilized on a regular basis to replenish the batteries. In addition, these water treatment systems require additional electrical circuits and components to operate from the two different power sources.

Automatic plumbing fixtures, such as toilet valves and sink faucets may include an electrically operated valve and a sensor. The sensor may sense the presence of a user of the automatic plumbing fixture and operate the electrically operated valve to provide a flow of water in response. Both the electrically operated valve and the sensor require electric power to operate. The power may be obtained by installing an electric cable from a power distribution panel to the automatic plumbing fixture. Where the automatic plumbing fixture is installed in an existing building, installation of a power distribution panel and/or an electric cable can be costly, time consuming and difficult.

For the foregoing reasons, a need exists for miniature hydro-electric generation equipment that is small enough to fit within a system such as a water treatment system, an automatic plumbing fixture, etc. and is capable of operating with enough efficiency to produce sufficient power to operate the system.

SUMMARY OF THE INVENTION

The present invention discloses a miniature hydro-power generation system that overcomes problems associated with the prior art. The embodiments of the miniature hydro-power generation system are capable of efficiently providing sufficient power to operate electrical devices by rotating at high revolutions-per-minute (RPM), such as above 5000 RPM. High RPM operation is possible due to minimization of losses and maximizing translation of the kinetic energy in a flowing liquid to rotational energy to produce electric power.

The hydro-power generation system may include a generally cylindrical housing having a plurality of paddles positioned to extend outwardly from an outer surface of the housing. The paddles may be generally concaved and extend perpendicular from the outer surface of the housing. The hydro-power generation system may also include a nozzle, a centering rod and an electrical generator. The nozzle may be configured to direct a stream of high velocity liquid at the paddles to induce rotation of the housing. The centering rod may extend through a cavity include in the housing. The housing may rotate around the centering rod in response to liquid striking the paddles.

The electrical generator may be a permanent magnet generator that is positioned within the cavity of the housing. The electrical generator includes a rotor coupled with the housing and a stator coupled with the centering rod. As the housing rotates, the rotor may be positioned in the housing to rotate around the stator and generate electric power. The rotor may produce a magnetic field that suspends the rotor around the stator in axial alignment. The housing may include bushings that surround the centering rod. Since the rotor is suspended around the stator, the housing is suspended around the centering rod. The bushings therefore surround the centering rod with little or no contact between the housing and the centering rod to reduce rotational friction and further improve efficiency as the housing rotates.

The housing may be formed from a first hub coupled with a second hub to form the cavity. The paddles may be held between the first and second hubs when the first and second hubs are engaged. The paddles may form a ring of paddles that concentrically surrounds the housing. The housing may also include a plurality of vents that are configured to evacuate liquid from the cavity when the housing rotates to reduce fluid impedance. The cavity therefore remains substantially dry as the paddles are subject to a stream of liquid from the nozzle and the housing rotates at high RPM.

The housing may be positioned completely within an outer housing. The outer housing may include an interior surface and an outlet. The interior surface may include ducting to reduce liquid spray and therefore reduce fluid impedance when the stream of liquid is directed at the paddles. The ducting may include fingers and channels to reduce the liquid spray and also channel liquid out of the outer housing. The fingers and channels may be configured in a swirl pattern on the interior surface based on the dispersion pattern of liquid being flung from the rotating housing. Liquid may be continuously channeled out of the outer housing by the ducting so that the outer housing remains substantially dry. The inner housing and the nozzle may therefore operate without being submerged in the liquid to further reduce fluid impedance and improve efficient energy transfer.

The hydro-power generation system may also include a plumbing fixture such as an automatic toilet flush fixture. The plumbing fixture may include an electrically operated valve, an energy storage device, a power controller, a sensor and a generator. The generator may produce electric power from a flow of liquid as previously described. The electric power may be stored in the energy storage device and used to energize the power controller, the sensor and the electrically operated valve. When the sensor senses use of the toilet, the electrically operated valve may be energized to open and provide a flow of liquid. The flow of liquid may be used by the generator to produce electric power to re-charge the energy storage device. The power controller may monitor the level of stored power in the energy storage device. If the level of stored power becomes low, the power controller may activate the electrically operated valve to open, and the generator may re-charge the energy storage device.

These and other features and advantages of the invention will become apparent upon consideration of the following detailed description of the presently preferred embodiments, viewed in conjunction with the appended drawings. The foregoing discussion has been provided only by way of introduction. Nothing in this section should be taken as a limitation on the following claims, which define the scope of the invention.

BRIEF DESCRIPTION OF THE DRAWINGS

FIG. 12 represents an end view of a nozzle illustrated in FIG. 11.

FIG. 13 represents a cross-sectional view of the nozzle illustrated in FIG. 12 taken along line 13—13.

FIG. 14 represents another cross-sectional view of the nozzle illustrated in FIG. 12 taken along line 14—14.

FIG. 15 represents a cross-sectional view of a portion of an outer housing of the hydro-power generation system illustrated in FIG. 11 taken along line 15—15.

FIG. 18 represents an exploded perspective view of an inner housing included in the hydro-power generation system illustrated in FIG. 11.

FIG. 19 represents a perspective view of a paddle included in the hydro-power generation system illustrated in FIG. 11.

FIG. 20 represents a cross-sectional view of the paddle illustrated in FIG. 19 taken along line 20—20.

DETAILED DESCRIPTION OF THE PRESENTLY PREFERRED EMBODIMENTS OF THE INVENTION

The exemplary embodiments of the invention are set forth below with reference to specific configurations, and those skilled in the art would recognize various changes and modifications could be made to the specific configurations while remaining within the scope of the claims. The presently preferred embodiments may be used with any system that requires a power supply and includes a water flow; however, the embodiments are designed for systems such as a water treatment system for residential or portable use, a plumbing fixtures, etc. Those skilled in the art would also recognize that the embodiments could be used with liquids other than water and use of the term "water" and "hydro" should not be construed as a limitation.

Figure 1:
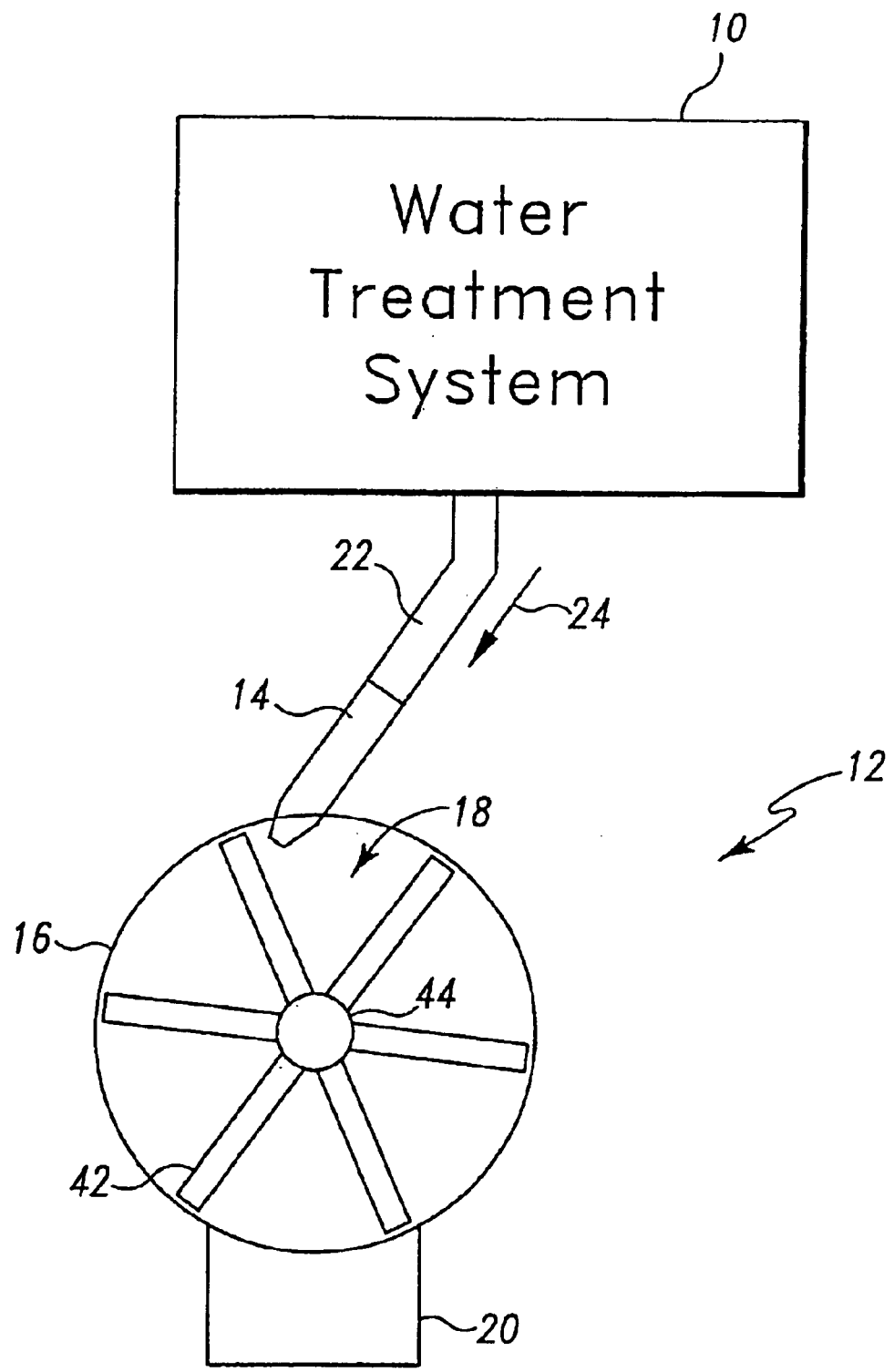
FIG. 1 illustrates a water treatment system coupled to one embodiment of the hydro-power generation system.

FIG. 1 is a side view of a water treatment system 10 connected with a preferred hydro-power generation system 12. In this embodiment, the hydro-power generation system 12 includes a nozzle 14, a housing 16, an impeller 18 and a housing outlet 20. The nozzle 14 is coupled with the water treatment system 10 by a conduit 22. The conduit 22 may be formed of PVC plastic or similar material and may be coupled to the nozzle 14 by threaded connection, friction fit or some other similar connection mechanism.

During operation, pressurized water flows from the water treatment system 10 into the hydro-power generation system 12 via the nozzle 14 as illustrated by arrow 24. The nozzle 14 is coupled with the housing 16 such that water flows through the nozzle 14 and is forced through the housing 16 to the housing outlet 20. In alternative embodiments, the hydro-power generation system 12 may be positioned within the water treatment system 10 or positioned to receive a supply of pressurized water before the water enters the water treatment system 10.

Figure 2:
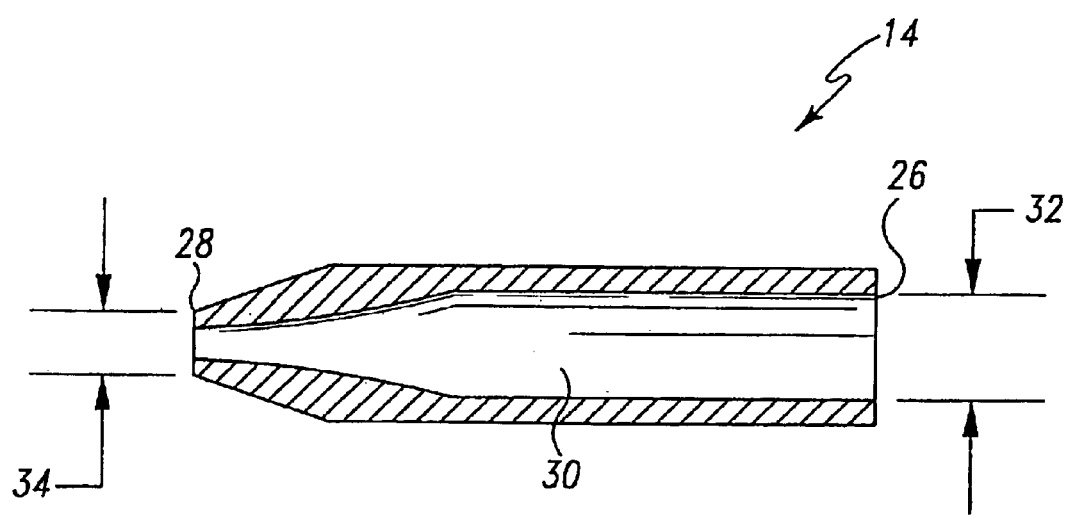
FIG. 2 illustrates a cross section of one embodiment of the nozzle illustrated in FIG. 1.

FIG. 2 illustrates a cross section of one embodiment of the nozzle 14. The preferred nozzle 14 is a sonic nozzle that increases the velocity of pressurized water flowing therethrough. In this embodiment, the nozzle 14 is capable of increasing the velocity of the water to sub-sonic speed. The nozzle 14 is formed of stainless steel or some other similar rigid material and includes a nozzle inlet 26 and a nozzle outlet 28. The nozzle inlet 26 is coupled to the water treatment system 10 as previously discussed. The nozzle outlet 28 is coupled to the housing 16 by friction fit, snap-fit, threaded connection or some other similar coupling mechanism capable of forming a watertight connection therebetween. The nozzle 14 may penetrate the housing 16 in any location that provides proper alignment of the nozzle 14 with the impeller 18 as will be hereinafter discussed.

The nozzle 14 includes a passageway 30 that provides for the flow of water therethrough. The passageway 30 is formed to be a first predetermined diameter 32 at the nozzle inlet 26 and a second predetermined diameter 34 at the nozzle outlet 28. In this embodiment, the second predetermined diameter 34 is about twenty-six percent of the first predetermined diameter 32. The passageway 30 remains the first predetermined diameter 32 for a predetermined length of the nozzle 14. The remaining portion of the passageway 30 is conically shaped by uniformly tapering the passageway 30 to the second predetermined diameter 34. In this embodiment, the passageway 30 of the nozzle 14 tapers at an angle of approximately 18 degrees between the first predetermined diameter 32 and the second predetermined diameter 34.

The configuration of the passageway 30 determines the velocity of the water exiting from the nozzle 14. In addition, the velocity of the water at the nozzle outlet 28 is dependent on the pressure of the water source and the back pressure downstream of the nozzle 14. A desirable predetermined range of the velocity at the nozzle outlet 28 may be determined using an expected range of pressure provided by the water treatment system 10 (illustrated in FIG. 1) at the nozzle inlet 26. For example, in a household water system, the pressure of the water supply is in a range of about twenty to sixty pounds-per-square-inch (PSI). The passageway 30 also provides a continuous and uniform stream of water at the nozzle outlet 28. During operation water flowing through the nozzle 14 flows into the housing 16 within a predetermined range of velocities and with a predetermined trajectory.

Referring back to FIG. 1, the housing 16 forms a conduit that may be composed of plastic or some other similar waterproof material capable of forming a rigid passageway for water. In this embodiment, the housing 16 includes a translucent portion as illustrated in FIG. 1 to allow viewing of the interior of the housing 16. The housing 16 is formed to encompass the impeller 18 that is in fluid communication with water as the water flows through the housing 16 after exiting the nozzle outlet 28.

The impeller 18 includes a plurality of blades 42 that are rigidly fastened to a hub 44. The blades 42 are positioned in the housing 16 such that water flowing from the nozzle 14 impinges upon the blades 42 of the impeller 18 at a predetermined angle. The predetermined angle is determined based on the expected pressure of the water at the nozzle inlet 26, the back pressure at the nozzle outlet 28 and the desired revolutions-per-minute (RPM) of the impeller 18. During operation, the flowing water acts on the impeller 18 causing it to rotate in a single direction within the housing 16. As discussed in detail below, as the impeller 18 rotates, this embodiment of the hydro-power generation system 12 converts the energy in the flowing water to rotational energy, which is then converted to electricity. In this embodiment, the impeller 18 is submerged in the water flowing through the housing 16.

Figure 3:
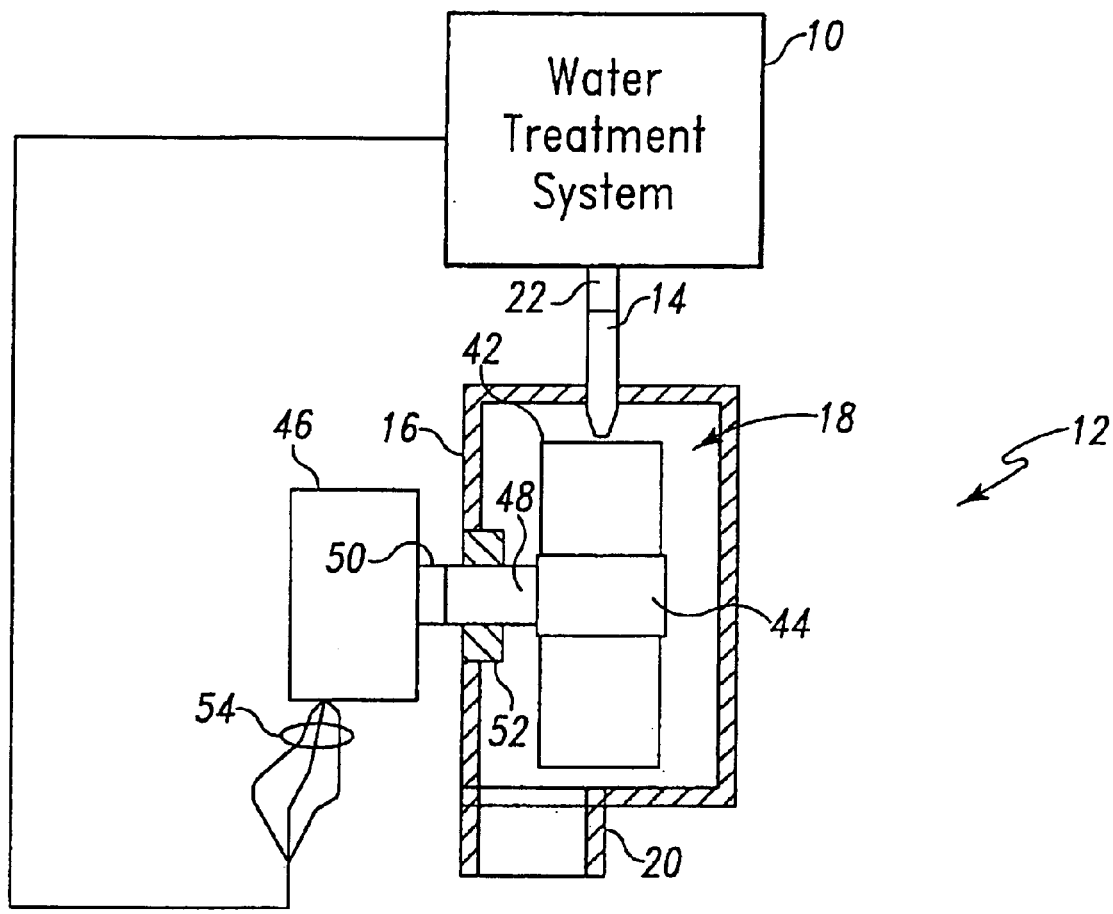
FIG. 3 illustrates the water treatment system and the hydro-power generation system illustrated in FIG. 1 rotated 90 degrees with a portion of the hydro-power generation system sectioned away.

FIG. 3 illustrates the embodiment depicted in FIG. 1 rotated 90 degrees with a portion of the housing 16 sectioned away. As illustrated, the impeller 18 is coaxially fastened to a generator 46 by a longitudinal extending shaft 48. The shaft 48 may be stainless steel or some other similar rigid material that is fixedly coupled with the impeller 18. The hub 44 of the impeller 18 is coaxially coupled to one end of the shaft 48 and a generator shaft 50, which is part of the generator 46, is coaxially coupled to the other end. The rigid coupling of the shaft 48 to the impeller 18 and the generator 46 may be by welding, press-fit or other similar rigid connection.

The rotatable shaft 48 longitudinally extends to penetrate the housing 16 through a watertight seal 52 made of rubber or other similar material. The watertight seal 52 is coupled to the housing 16 and is formed to allow the shaft 48 to rotate freely without the escape of water from within the housing 16. The shaft 48 longitudinally extends to the generator 46 that is positioned adjacent the housing 16. Although not illustrated, the outer surface of the generator 46 may be coupled to the housing 16 by, for example, nuts and bolts, rivets or other similar mechanism capable of fixedly coupling the housing 16 and generator 46.

During operation, as water flows through the housing 16 and the impeller 18 rotates, shafts 48, 50 correspondingly rotate, causing electricity to be produced from the generator 46. In an alternative embodiment, a magnetic coupler (not shown) is used in place of the shaft 48 to eliminate the need for penetration of the housing 16. In this embodiment, the impeller 18 includes magnets with sufficient magnetic strength to rigidly couple with similar magnets positioned on the generator shaft 50 outside the housing 16. During operation, when the impeller 18 rotates, the magnetic attraction of the magnets oriented on the impeller and the magnets oriented on the generator shaft 50 cause rotation of the generator shaft 50 thereby generating electricity from the generator 46.

In this embodiment, the generator 46 may be a permanent magnet generator capable of generating alternating current (AC). The alternating current (AC) may be rectified to produce direct current (DC). In an alternative embodiment, the generator 46 may be capable of generating both AC and DC current. The electricity is transferred from the generator 46 by a plurality of conductors 54 that may be wires, busses or other similar materials capable of conducting electricity. The voltage level of the electricity produced is a function of the revolutions-per-minute of the impeller 18. As previously discussed, the velocity of the water flowing from the nozzle 14 may be designed within a predetermined range thereby controlling the voltage output of the electricity generated by the generator 46.

The alternating current or rectified direct current produced by this embodiment may be used to power the water treatment system 10 and may also be used to charge an energy storage device (not shown) such as, for example, a battery or capacitors. The rotation of the impeller 18 or the duration of the electricity being produced may also provide a mechanism for flow-based measurements such as, flow rates or the quantity of water that has flowed through the water treatment system 10. The rotation of the impeller 18 or the duration of the electricity being produced may be combined with the back electromagnetic force (EMF) of the generator 46 to provide the flow-based measurements. Those skilled in the art would recognize that the hydro-power generation system 12 may also be used in other systems besides the water treatment system 10.

Figure 4:
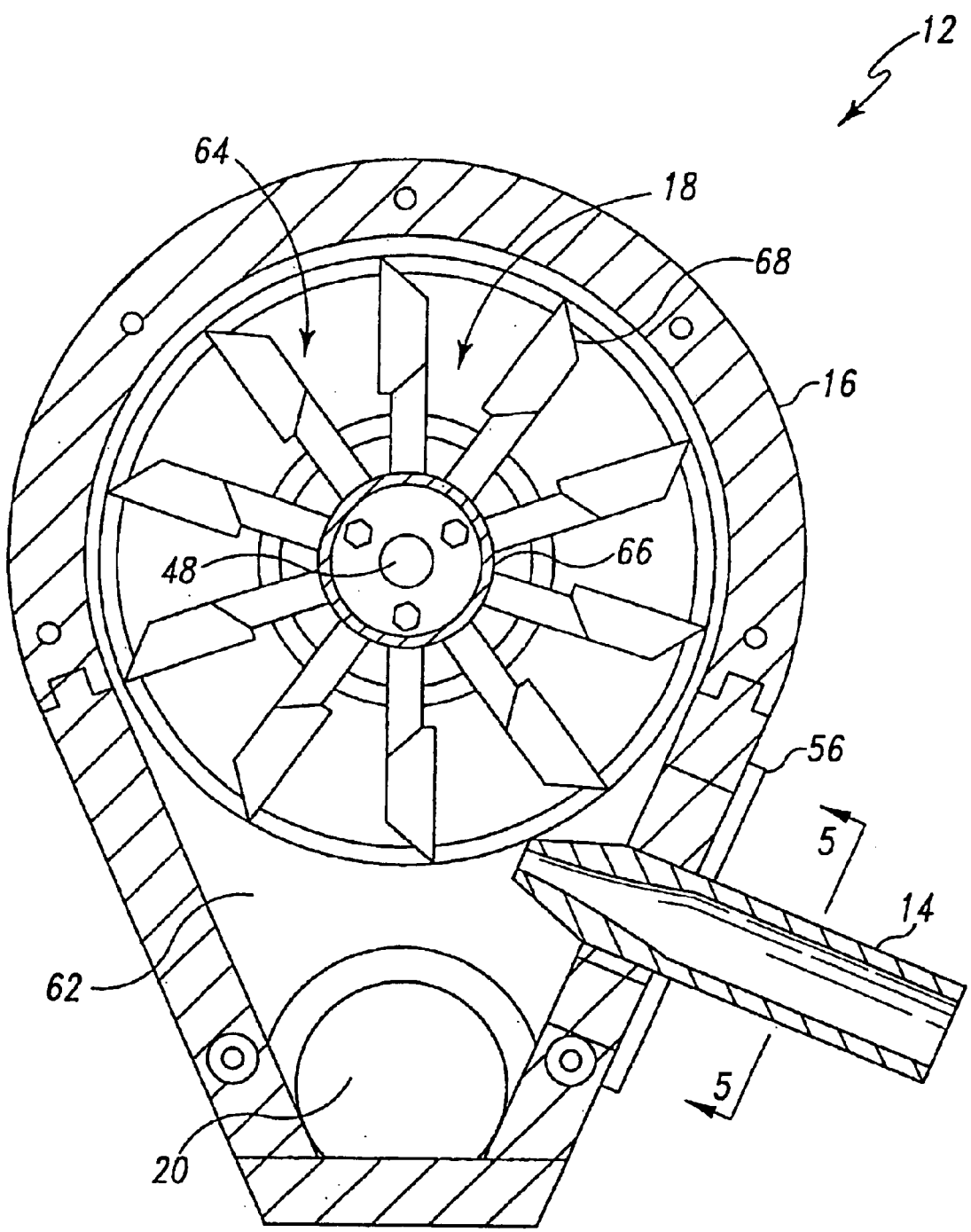
FIG. 4 illustrates a cross-section of another embodiment of the hydro-power generation system.

FIG. 4 illustrates a cross sectional view of another embodiment of the hydro-power generation system 12. This embodiment is similarly coupled to the water treatment system 10 as in the embodiment illustrated in FIG. 1 and includes a nozzle 14, a housing 16, an impeller 18 and a housing outlet 20. Similar to the previously discussed embodiment, the nozzle 14 provides water at high velocity that is directed at the rotatable impeller 18. However, in this embodiment, the impeller 18 is not submerged in water within the housing 16 during operation. As such, the water from the nozzle 14 forms a stream that is directed at the impeller 18.

The nozzle 14 may be a sonic nozzle similar to the previously discussed nozzle 14 illustrated in FIG. 2. The nozzle 14 penetrates the housing 16 and is coupled thereto by a mounting plate 56. The mounting plate 56 is positioned adjacently contacting the outer surface of the housing 16. Those skilled in the art would recognize that other methods exist that could be used to couple the nozzle 14 with the housing 16.

Figure 5:
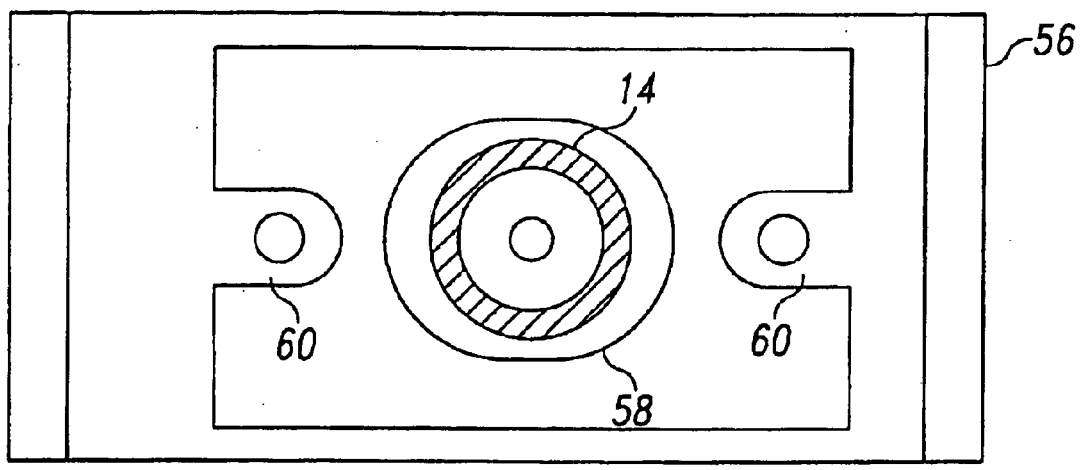
FIG. 5 illustrates a cross-section of the nozzle illustrated in FIG. 4 taken along line 5—5.

FIG. 5 illustrates a cross sectional view of the nozzle 14 mounted in the mounting plate 56 of this embodiment. The mounting plate 56 includes a longitudinal slot 58 and a pair of ears 60 that allow adjustment of the nozzle 14 to an optimal position in relation to the impeller 18. In this embodiment, the nozzle 14 may be fixedly mounted to the housing 16 when the optimal position is achieved by inserting threaded screws in the ears 60. In alternative embodiments, the mounting plate 56 provides a single predetermined desired position of the nozzle 14 when the fasteners such as, for example, threaded screws, rivets or pins fixedly mount the mounting plate 56 on the housing 16.

Referring again to FIG. 4, the desired position of the nozzle 14 is such that the nozzle 14 longitudinally extends into the housing 16. The housing 16 of this embodiment includes a housing cavity 62 that is defined by the inner walls of the housing 16 as illustrated in FIG. 4. The housing cavity 62 is an air space that includes the impeller 18 positioned therein. During operation, water is discharged from the nozzle 14 into the housing cavity 62 with a predetermined trajectory to strike the impeller 18 at a predetermined angle. The predetermined angle is based on the desired RPM of the impeller 18 and the range of the pressure of water supplied to the nozzle 14 from the water treatment system 10. The cooperative operation of the nozzle 14 and the impeller 18 are not limited to operation with pressurized water and other fluids such as, for example, air could similarly be utilized.

As further illustrated in FIG. 4, the impeller 18 includes a plurality of blades 64. Each of the blades 64 of this embodiment are fixedly coupled to an impeller hub 66 at one end and include a paddle 68 formed at the opposite end. The impeller hub 66 is fixedly coupled to a shaft 48 as in the previously discussed embodiments. Those skilled in the art would recognize that the quantity of the blades 64 and the size of the impeller 18 could vary depending on the application.

Figure 6:
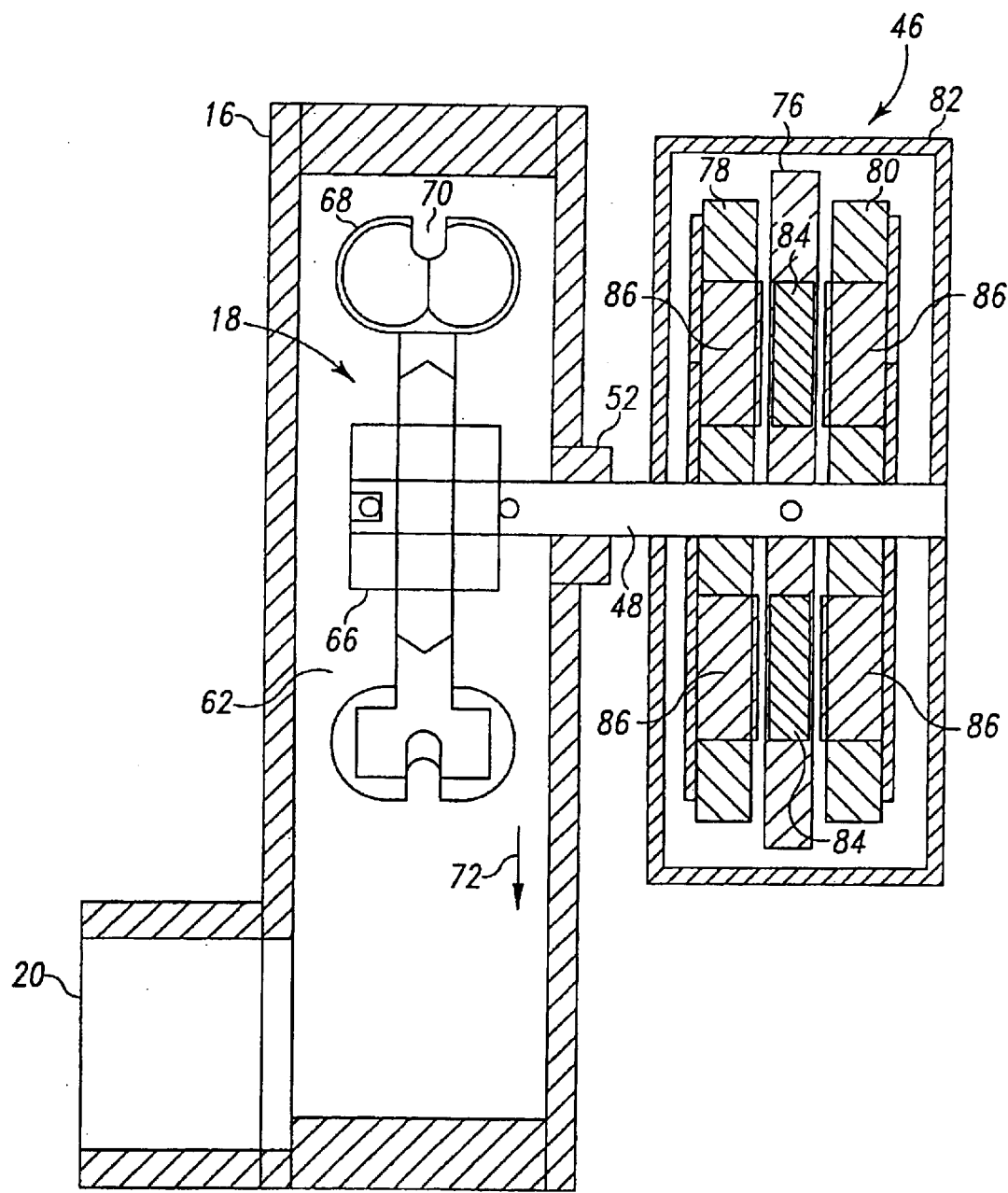
FIG. 6 illustrates the hydro-power generation system illustrated in FIG. 4 rotated 90 degrees with a portion of the hydro-power generation system sectioned away.

FIG. 6 illustrates the embodiment hydro-power generation system 12 illustrated in FIG. 5 rotated 90 degrees with a portion of the housing 16 sectioned away for illustrative purposes. As illustrated, the hydro-power generation system 12 includes the housing 16 coupled to the generator 46 with the shaft 48 as in the previously discussed embodiments. In addition, the shaft 48, which is rotatable, longitudinally extends from the impeller 18 into the generator 46 through the watertight seal 52. In an alternative embodiment, the shaft 48 could be modified with a magnetic coupler, as previously described, thereby eliminating the penetration of the housing 16 and the watertight seal 52. As illustrated, the shaft 48 rotatably positions the impeller 18 in the airspace within the housing cavity 62 with the paddles 68 thereby rotating about the shaft 48.

As illustrated in FIG. 6, each of the paddles 68 of this embodiment are formed in a parabolic shape that includes a slot 70. The parabolic shape of the paddles 68 provide a uniform receiver of the energy present in the water discharged from the nozzle 14 (illustrated in FIG. 5). The slots 70 allow the energy of the discharged water to pass to the next paddle 68 as the impeller 18 rotates. The transitional passing of the energy in the discharged water to the next paddle 68 maximizes the efficiency of the energy transfer from the water to the impeller 18. In alternative embodiments, the blades 64 could be formed in other shapes and configurations that are conducive to the efficient transfer of energy from other fluids discharged from the nozzle 14. For example, when the fluid is air, the blades 64 may be formed as vanes, fins or other similar structure capable of translating the energy from the flowing air to the rotation of the impeller 18.

During operation, after the stream of water strikes the impeller 18 at a predetermined angle, the water falls by gravity as indicated by arrow 72 toward the housing outlet 20. As such, the water collects at the housing outlet 20 and is thereby channeled out of the housing 16. Since the impeller 18 is not submerged in water, the bulk of the energy transferred from the water stream to the impeller 18 is provided as rotational force to the shaft 48.

The rotation of the shaft 48 causes rotation of a portion of the generator 46. One embodiment of the generator 46 includes a rotor 76, a first stator 78, and a second stator 80 positioned within a generator housing 82. The rotor 76 is fixedly coupled to the shaft 48 and rotates therewith. The first and second stators 78, 80 are fixedly coupled to the generator housing 82 and circumferentially surround the shaft 48. The rotor 76 is positioned between the first and second stators 78, 80 to form the generator 46.

The rotor 76 of this embodiment may be in the form of a disk that includes a plurality of permanent magnets 84. The permanent magnets 84 are uniformly place in predetermined positions within the rotor 76 to operatively cooperate with the first and second stators 78, 80. Each of the first and second stators 78, 80 in this embodiment may also form disks that include a plurality of coils 86. The coils 86 are positioned uniformly within the first and second stators 78, 80 to operatively cooperate with the permanent magnets 84. The coils 86 may be electrically connected to form one or more windings that are operable to generate electricity. The number of poles and the design of the first and second stators 78, 80 are dependent on a number of factors. The factors include: the strength of the gaussian field formed by the permanent magnets 84 and the back EMF, as well as the desired RPM and the desired power output of the generator 46.

In this embodiment, the rotation of the rotor 76 causes magnetic flux that is generated by the permanent magnets 84 to similarly rotate thereby producing electricity in the first and second stators 78, 80. The rotor 76 and the first and second stators 78, 80 operatively cooperate to generate alternating current (AC). The AC may be rectified and stabilized by the generator 46 to supply both AC and direct current (DC). In an alternative embodiment, the permanent magnets 84 may be positioned on the first and second stators 78, 80 such that the generator 46 is operable to generate direct current (DC). In another alternative embodiment, the generator 46 is similar to the generator 46 discussed with reference to FIG. 3.

During operation, pressurized water may be supplied from the water treatment system 10 (illustrated in FIG. 1) to the hydro-power generation system 12. As in the previous embodiments, alternative embodiments of the hydro-power generation system 12 may supply water to the water treatment system 10 or be positioned within the water treatment system 10. In this embodiment, water is supplied from the water treatment system 10 to the nozzle 14 as previously discussed.

Pressurized water flows through the nozzle 14 and discharges with high velocity into the housing cavity 62 thereby striking the paddles 68 on the impeller 18 at a predetermined angle of incidence. When the water strikes the paddles 68, the energy in the discharged water is translated to the impeller 18 causing rotation in a single direction. As the impeller 18 rotates, a portion of the discharged water stream also streams through the slots 70 and strikes another of the paddles 68 on the impeller 18. Following the collision of the water with the paddles 68 and the accompanying transfer of energy, the water falls by gravity to the housing outlet 20 and flows out of the housing 16. Accordingly, the housing cavity 62 remains an air space during operation and is not completely filled with water during operation.

The rotation of the impeller 18 causes rotation of the shaft 48 thereby rotating the rotor 76 of the generator 46. In this embodiment, the rotor 76 rotates at about 2400 revolutions-per-minute (RPM). Rotation of the rotor 76 induces the generation of electricity that is supplied to the water treatment system 10. As previously discussed, the range of the voltage level produced by the generator 46 is based on the range of velocity of the water flowing through the nozzle 14. Accordingly, the voltage range of the generator can be selected by selecting a predetermined range of velocity for the flowing water through the nozzle 14.

Figure 7:
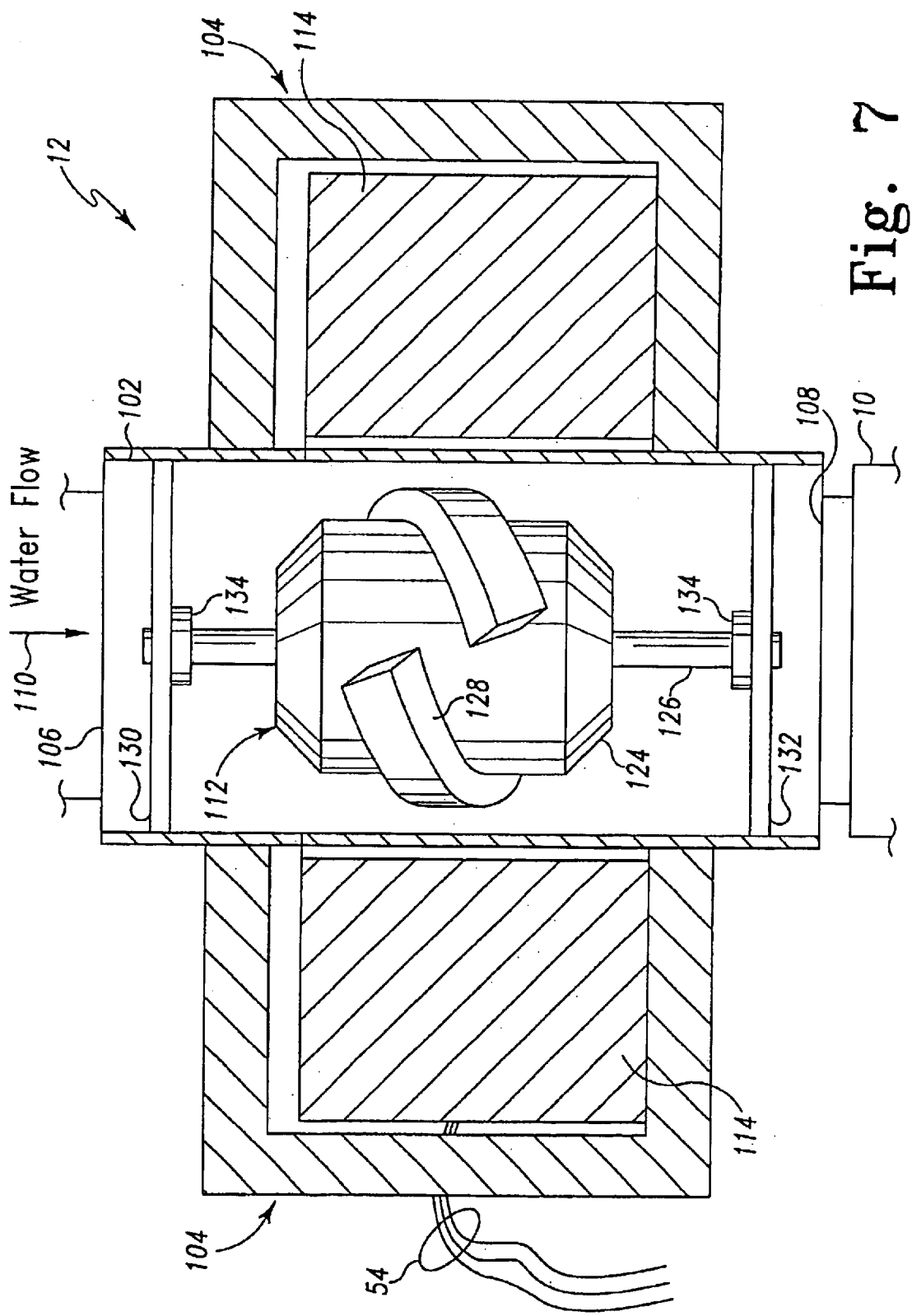
FIG. 7 represents a cross-sectional view of another embodiment of the hydro-power generation system coupled to the water treatment system.

FIG. 7 illustrates a cross-sectional view of another embodiment of the hydro-power generation system 12 which is preferentially coupled with the water treatment system 10. As illustrated, the hydro-power generation system 12 includes a rotor housing 102 and a stator housing 104. The rotor housing 102 forms a conduit that may be composed of plastic or other similar rigid material and includes an inlet 106 and an outlet 108. During operation the inlet 106 receives the flowing water as illustrated by arrow 110 and the outlet 108 channels the flowing water to the water treatment system 10. In alternative embodiments, the hydro-power generation system 12 may be positioned within the water treatment system 10 or positioned to receive water flowing out of the water treatment system 10. As previously discussed, the flow of water through the hydro-power generation system 12 may be controlled by the water treatment system 10.

As illustrated in FIG. 7, the rotor housing 102 contains a rotor 112 and the stator housing 104 contains a stator 114. The rotor 112 of this embodiment may be a twelve-pole permanent magnet rotor having six north/south pole combinations. As set forth in detail below, the stator 114 of this embodiment may be an annular ring designed with eight north/south pole combinations. The rotor 112 and the stator 114 cooperatively operate to produce electricity during operation. As known in the art, a stator contains a stationary winding that can be configured to contain any number of poles depending on the magnitude of the voltage needed at the output. The number of poles in the winding disclosed in the present embodiment should not be construed as a limitation on the present invention.

Figure 8:
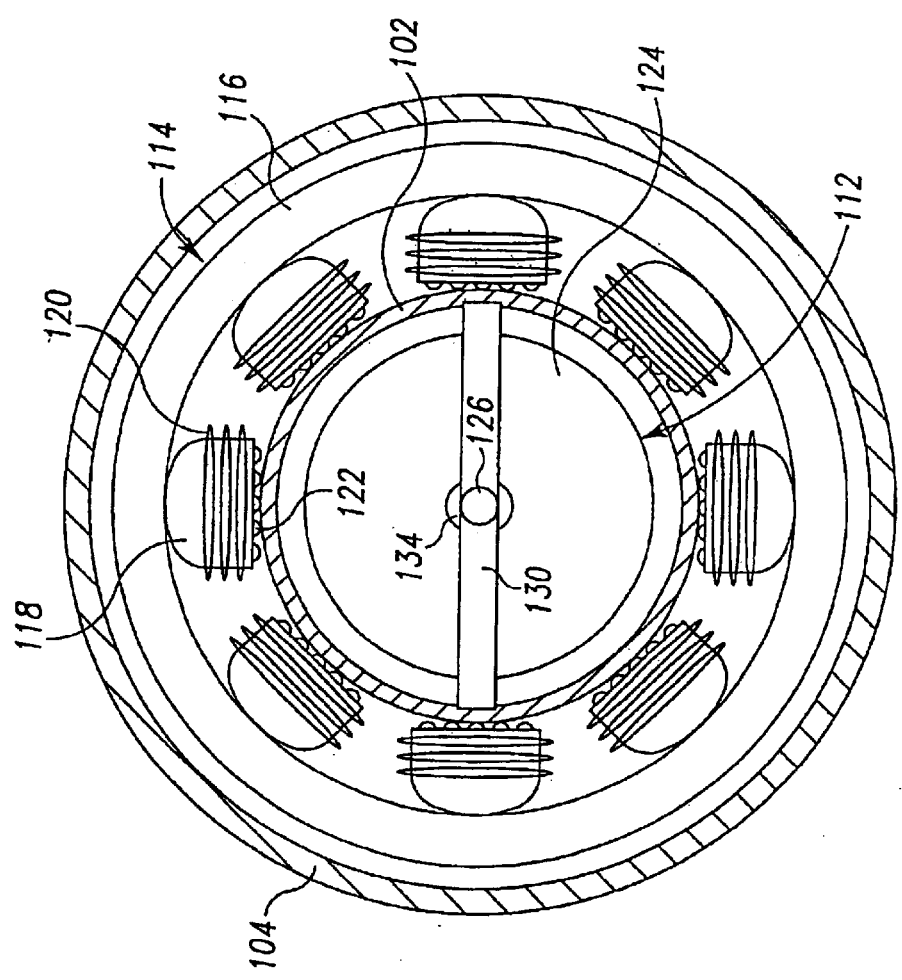
FIG. 8 represents a top view of the embodiment of the hydro-power generation system illustrated in FIG. 7 with a portion of the stator housing sectioned away.

FIG. 8 illustrates a top view of the embodiment depicted in FIG. 7 with the top portion of the stator housing 104 sectioned away for illustrative purposes. The stator 114 is fixedly positioned in the stator housing 104 to circumferentially surround the rotor housing 102. The stator 114 includes a core 116, a plurality of salient poles 118 and a plurality of coils 120. The core 116 may be composed of iron, steel or other similar material and is formed to include the salient poles 118. In this embodiment, there may be eight salient poles 118 that are each surrounded by coils 120.

The salient poles 118 are formed on the stator 114 such that they circumferentially surround the rotor housing 102. Each of the salient poles 118 includes a formed end that is known in the art as a pole shoe 122. The pole shoes 122 are located adjacent the rotor housing 102. The pole shoes 122 conduct a constant magnetic flux formed by the rotor 112 through the coils 120. The coils 120 may be wire or some other similar material capable of conducting electricity and being wrapped around the salient poles 118. Although not illustrated, the coils 120 are electrically connected to form the winding. As known in the art, the number of turns of wire used for each coil 120 is determined by the voltage and power requirements, the minimum and maximum revolutions of the rotor 112, the maximum allowable back-pressure, the required inductance and the magnetic gauss.

Referring again to FIG. 7, the stator 114 is transversely positioned perpendicular to the central axis of the rotor housing 102. Since the stator 114 is positioned outside the rotor housing 102, it is isolated from fluid communication with the water flowing within the rotor housing 102. The stator housing 104 is fixedly coupled to the rotor housing 102 thereby providing a predetermined position on the rotor housing 102 for the stator 114. In this embodiment, the stator housing 104 is coupled with the external surface of the rotor housing 102 by a friction fit. Those skilled in the art would recognize that various other ways of coupling the rotor housing 102 and the stator housing 104 exist.

In this embodiment of the hydro-power generation system 12, the rotor 112 includes a permanent magnet 124 that can be formed of metal, sintered metal, extruded metal, plastic injected or ceramic material. The permanent magnet 124 forms a constant magnetic flux and is coupled with a rotor shaft 126. The rotor shaft 126, which is rotatable, longitudinally extends from opposite ends of the permanent magnet 124 and may be composed of stainless steel or other rigid, corrosion resistant material. The permanent magnet 124 is formed with its central axis coaxial with the rotor shaft 126. The outer surface of the permanent magnet 124 may be formed in a streamline shape to include at least one rotor blade 128. The permanent magnet 124 of this embodiment is formed in a barrel shape with a single helical ridge forming the rotor blade 128. In alternative embodiments, the rotor blade 128 could be turbine blades or other similar devices capable of inducing rotation of the rotor 112 when subjected to flowing water.

As illustrated in FIG. 7, the rotor 112 is positioned within the rotor housing 102 coaxial with the central axis of the rotor housing 102. One end of the rotor shaft 126 of the rotor 112 is inserted in a first collar 130 and the other end of the rotor shaft 126 is inserted in a second collar 132. In this embodiment, the ends of the rotor shaft 126 increase in diameter to form a solid sphere to facilitate fastening to the first collar 130 and the second collar 132. The first collar 130 and the second collar 132 are formed of plastic or other similar material and create a transverse strut perpendicular to the central axis of the rotor housing 102. The first collar 130 and the second collar 132 each contain a bearing 134 or other similar device to allow the rotor shaft 126 to rotate freely. Additionally, the first collar 130 and the second collar 132 are coupled to the rotor housing 102 at a predetermined distance from each other such that the rotor 112 can be suspended therebetween.

The rotor 112 is positioned in the rotor housing 102 such that water flowing through the rotor housing 102 impinges upon the rotor blade 128 that forms a part of the rotor 112. The rotor blade 128 acts as a paddle, causing the flowing water to act on the rotor 112. The flowing water causes the rotor 112 to rotate in a single direction about the central axis of the rotor housing 102. The rotor 112 is positioned within the stator 114 such that the axis of the rotor 112 is concentric with that of the stator 114. The rotor 112 operatively cooperates with the stator 144 to form the generator.

During operation, as water is flowing and the rotor 112 is rotating, the constant magnetic flux generated by the rotor 112 also rotates and penetrates into the stator 114 thereby intrinsically creating power. An air gap of a specified distance must be maintained between the rotor 112 and the stator 114 to allow the constant magnetic flux from the rotor 112 to induce the generation of electricity from the stator 114. In these embodiments, the "air gap" between the permanent magnet 124 of the rotor 112 and the pole shoes 122 of the stator 114 consists of flowing water and the rotor housing 102. The flow of fluid and the rotor housing 102 do not affect the constant magnetic flux. Accordingly, the rotating constant magnetic flux from the rotating rotor 112 induces the production of electricity from the coils 120 of the stator 114.

As the water flows through the rotor housing 102 causing the rotor 112 to rotate, the rotating constant magnetic flux is imparted on the winding of the stator 114 and electricity is produced. The electricity flows through conductors 54 to power a device which is a water treatment system 10 in this embodiment. The hydro-power generation system 12 of this embodiment illustrated in FIGS. 7 and 8 produces alternating current (AC) that may be used to power the water treatment system 10. In an alternative embodiment, the hydro-power generation system 12 may rectify the alternating current (AC) to produce direct current (DC). In another alternative embodiment, the hydro-power generation system 12 supplies both AC and DC current to the water treatment system 10 by rectifying and stabilizing the alternating current (AC). The DC current may also be used to charge an energy storage device (not shown). The rotation of the rotor 112 and the duration that electricity is produced may also be used to provide flow-based measurements such as, the flow rate or the quantity of water flowing through the water treatment system 10.

Figure 9:
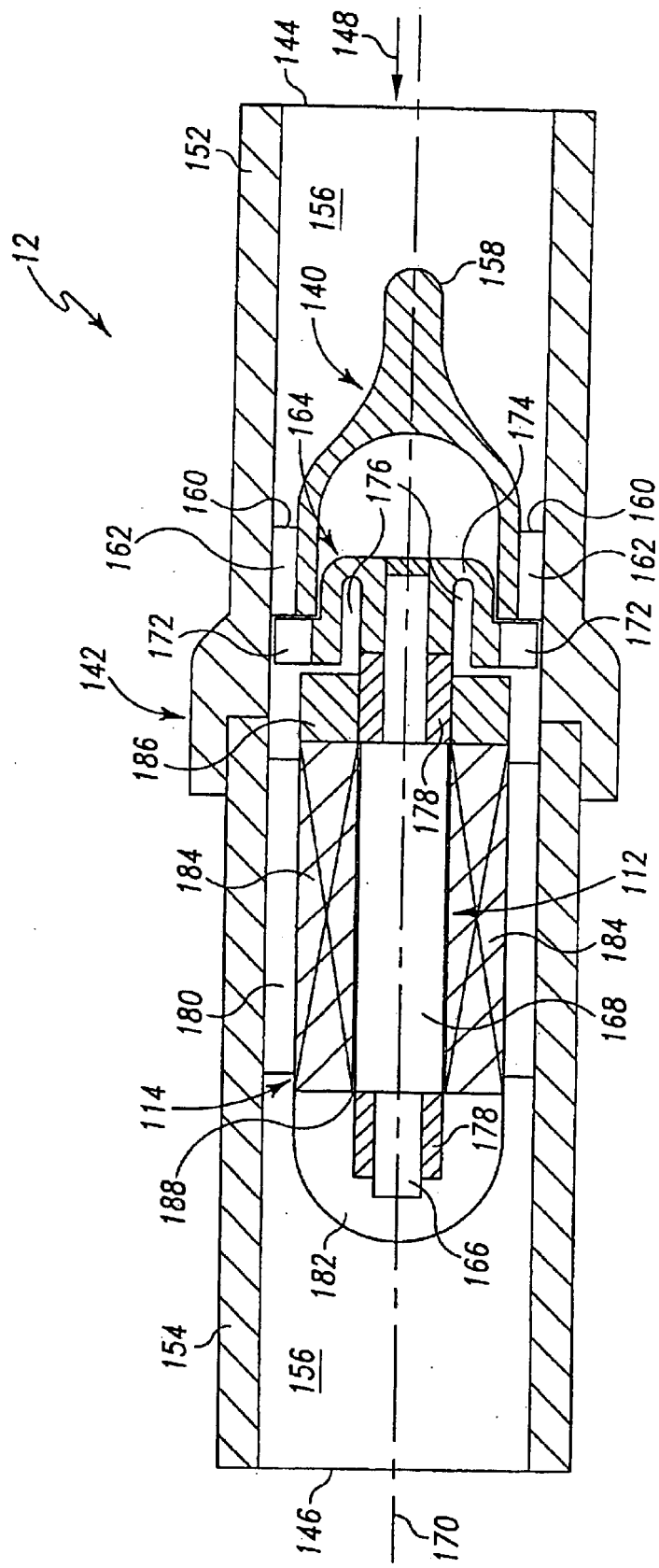
FIG. 9 represents a cross-sectional view of another embodiment of the hydro-power generation system.

FIG. 9 illustrates a cross-sectional view of yet another embodiment of the hydro-power generation system 12 that is similar in concept to the previous embodiment disclosed with respect to FIGS. 7 and 8. This embodiment includes a rotor 112, a stator 114 and a turbine nozzle 140 positioned in a housing 142. The housing 142 forms a conduit that includes an inlet 144 and an outlet 146. As water or some other fluid flows into the inlet 144 as illustrated by arrow 148, the water flows through the housing 142 and is channeled out of the housing 142 by the outlet 146. In one embodiment, the hydro-power generation system 12 may be positioned within a water treatment system 10 (illustrated in FIG. 1), following the water treatment system 10 or supplying water to the water treatment system 10.

The housing 142 may be formed of plastic or similar rigid material capable of channeling water. The housing 142 of this embodiment includes a first section 152 and a second section 154 to facilitate assembly and maintenance. The first and second sections 152, 154 may be fixedly coupled by gluing, friction fit, threaded connection, sonic welding or some other means of providing a similar rigid connection. The housing 142 forms a passageway 156 for the flow of water therethrough. Fixedly positioned within the passageway 156 is the turbine nozzle 140.

The turbine nozzle 140 of this embodiment may be generally conical in shape and may be formed of plastic or some other similar rigid material. The turbine nozzle 140 may be integrally formed to include a tip 158 and a plurality of struts 160. The tip 158 may be centrally located in the passageway 156 and serves to direct the flowing water outwardly toward the inner wall of the housing 142. The struts 160 are fixedly coupled to the inner wall of the housing 142 by, for example friction fit, snap-fit, threaded connection or other similar rigid connection.

The struts 160 fixedly hold the turbine nozzle 140 in the passageway 156 and include a plurality of channels 162 to allow water to flow through the housing 142. The size of the channels 162 may be adjusted to control the velocity of the flowing water. As in the nozzle 14, previously discussed with reference to FIG. 2, a predetermined range of velocity can be determined. The predetermined range of velocity is based on the expected pressure range of the water flowing in the inlet 144 as well as the backpressure of the hydro-power generation system 12. In addition, the struts 160 may be oriented in a predetermined configuration to act as vanes to direct the flowing water. The flowing water may be directed, for example, to act upon the rotor 112 in a predetermined way, to eliminate turbulence, to adjust pressure drop or to increase the efficiency of operation.

Figure 10:
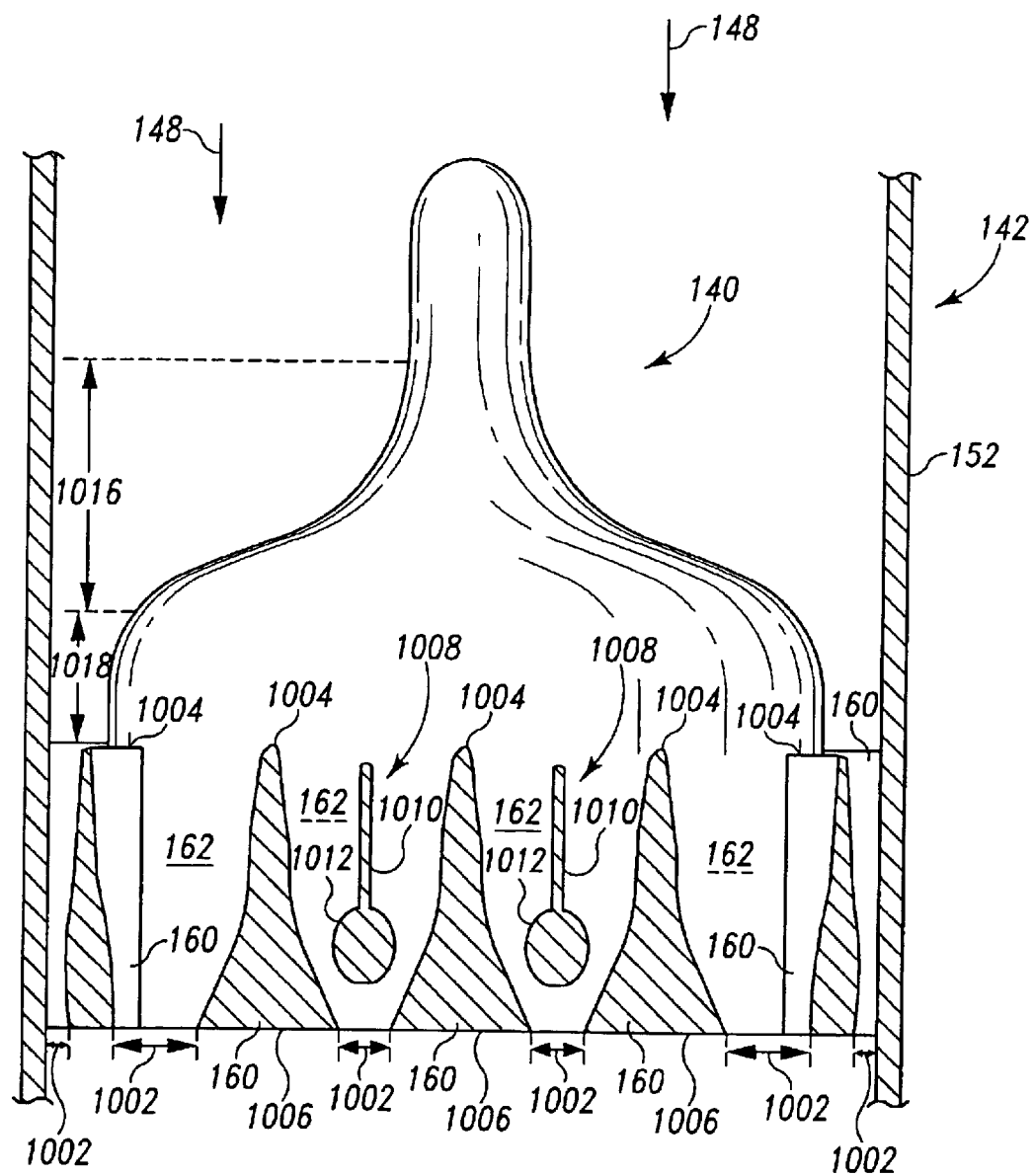
FIG. 10 represents a cross-sectional view of a portion of the hydro-power generation system of FIG. 9.

FIG. 10 is cutaway top view of a portion of the hydro-power generation system 12 of FIG. 9 illustrating the nozzle 140 and the struts 160 within the first section 152 of the housing 142. The struts 160 may be positioned at a determined distance 1002, such as 4.42 millimeters (0.174 inches) from each other around the outside of the nozzle 140 to form the channels 162. Each of the struts 160 includes a leading end 1004 and a trailing end 1006. The leading end 1004 of adjacently located struts 160 may form an entry duct, and the trailing end 1006 of adjacently located struts 160 may form an exit duct. The flow of liquid, as indicated by arrow 148, first reaches the leading end 1004 and enters the entry duct. Within the channels 162, the liquid is increased in velocity prior to reaching the trailing end 1006 of the struts 160.

The width of the channels 162 may become gradually narrower toward the trailing end 1006 as illustrated. As such, the cross-sectional area between the channels is reduced by a predetermined amount such as about 10% to 20%. Since the pressurized liquid is forced into an increasingly narrower channel 162, velocity increases. The gradual reduction in cross-sectional area between the channels 162 minimizes back pressure while increasing the velocity of the flowing liquid. In addition, non-laminar flow of liquid within the channels 162 is minimized by the gradually narrowing channels 162.

The struts 160 may also include a plurality of flow straightners 1008. The flow straightners 1008 may be included in the channels 162 to further minimize non-laminar flow. Similar to the struts 160, the flow straightners 1008 may be fixedly coupled with the inner wall of the first section 152 and extend into the channels 162. The example flow straightners 1008 may include a blade 1010 coupled with a body 1012. The blade 1010 may be a substantially straight section of the flow straightners 1008 that extends from near the leading end 1004 toward the trailing end 1006 of each of the struts 160. The body 1012 may be spherical shaped body that is positioned a determined distance upstream of the exit duct formed by the trailing ends 1006 of the adjacently positioned struts 160. In other examples, the flow straightners 1008 may be any other hydrodynamic shape to define the flow of liquid and maximize uniform flow thorough the channels 162.

As further illustrated in FIG. 10, the nozzle 140 may be divided into a compression region 1016 followed by a settlement region 1018. Within the compression region 1016, an abrupt transition in the direction of flow of the liquid may occur. The abrupt transition may increase turbulence in the flow of liquid. Turbulence may increase as the volume of liquid capacity within the first section 152 decreases. As the volume decreases, compression and the velocity of the liquid increase. The decrease in volume in the compression region 1016 may be predetermined to achieve a desired flow rate based on the expected pressure range of the flowing liquid. Within the compression region 1016, the flowing liquid is forced outward toward the inner wall of the housing 142 which may increase turbulence and/or non-laminar flow.

The settlement region 1018 provides an area with a uniform volume of liquid capacity that allows turbulence in the flowing liquid to subside and the liquid to have a more laminar flow. The settlement region 1018 may be a predetermined length based on the projected amount of turbulence in the flowing liquid. Non-laminar flow of the liquid may be reduced prior to entering the channels 162. Within the channels 162, the velocity of the flowing liquid is further increased, and the liquid is then directed to the rotor 112.

Referring again to FIG. 9, the rotor 112 of this embodiment includes a turbine rotor 164, a rotor shaft 166 and a permanent magnet 168. The rotor 112 is rotatably positioned within the passageway 156 such that water flowing in the passageway 156 causes rotation of the rotor 112 about a central axis 170 of the housing 142. Rotation of the rotor 112 occurs when the flowing water acts upon the turbine rotor 164. The turbine rotor 164 may be formed of stainless steel, aluminum, plastic or other similar rigid material that is capable of withstanding the rotational forces and the force of the flowing water. The turbine rotor 164 includes at least one turbine blade 172 and a body 174.

The turbine blade 172 is positioned to receive energy from water flowing through the struts 160. The turbine blade 172 may be a plurality of vanes, a helical ridge or other mechanism formed on the body 174 that is capable of converting the energy of the flowing water to rotational energy. The turbine blade 172 of this embodiment is integrally formed with the body 174 and extends until positioned adjacent the inner wall of the housing 142. The body 174 may be formed to define a cavity 176 that circumferentially surrounds a portion of the rotor shaft 166.

It should be noted by the reader that the depth of the channels 162 are less than the depth of the turbine blade 172 with respect to the inner wall of the housing 142. The differential depth provides circulation of the flowing water as will be hereinafter discussed. In addition, the flow path of the water is substantially straight past the stator 114. The volume of the flow path is also larger following the channels 162 to provide a determined drop in pressure of the flowing water. The flowing water therefore discharges substantial amounts of kinetic energy to the rotating turbine blade 172 as the water flows past the turbine blade 172. The kinetic energy in the flowing water is efficiently extracted by the turbine blades 172 without significant losses and inefficiencies since only the turbine blades 172 are directly in the high velocity stream of flowing water.

The rotor shaft 166 is rotatable and may be integrally formed with the turbine rotor 164 or, the rotor shaft 166 may be fixedly coupled thereto by press-fit, threaded connection or similar coupling mechanism. The rotor shaft 166 may be stainless steel or other similar rigid material that may longitudinally extend through the permanent magnet 168. The permanent magnet 168 may be an extruded magnet or plastic injected magnet. Alternatively, the permanent magnet may be formed of metal, sintered metal, ceramic material or some other similar material with magnetic properties. The permanent magnet 168 may be fixedly coupled to the rotor shaft 166 by friction fit, molding or other similar mechanism. The rotor 112 is rotatable held in position by a plurality of bearings 178.

The bearings 178 circumferentially surround a portion of the rotor shaft 166 at opposite ends of the permanent magnet 168. The bearings 178 may be carbon graphite, Teflon, ball bearings, ceramic, ultra high molecular weight (UHMW) polyethylene or other similar bearings capable of withstanding the rotation of the rotor shaft 166. In this embodiment, the bearings 178 are lubricated by water present in the passageway 156. In addition, the flowing water is operable to cool the bearings 178 as will be hereinafter described. The bearings 178 are fixedly coupled and held in position by the stator 114.

The stator 114 of this embodiment includes a plurality of exit guide vanes 180, a fin 182, a plurality of coils 184 and a cap 186. As illustrated in FIG. 9, the stator 114 is fixedly positioned in the passageway 156 by the exit guide vanes 180. The exit guide vanes 180 are fixedly coupled with the inner wall of the housing 142 by, for example, glue, friction fit, snap fit or similar rigid coupling mechanism. The exit guide vanes 180 longitudinally extend parallel with the inner wall of the housing 142 and provide channels for the flow of water therethrough. The exit guide vanes 180 are formed to channel the flowing water to the outlet 146 to reduce turbulence, air bubbles, back pressure and other similar behavior of the flowing water that may effect efficient operation. The fin 182 is similarly formed to channel the flowing water to the outlet 146.

Although not illustrated, the exit guide vanes 180 may be formed in a swirl pattern that resembles a helically shaped coil (or rifling) that is concentric with the central axis 170. The exit guide vanes 180 may gradually un-coil in the direction of the fin 182 to eventually become substantially parallel with the central axis 170. In this configuration, the exit guide vanes 180 may reduce turbulence and create a laminar flow.

During operation, liquid received by the exit guide vanes 180 may include a swirling tendency due to the rotation of the turbine blade 172. The swirling tendency in the liquid may substantially match the swirl pattern of the exit guide vanes 180. Accordingly, the liquid enters the exit guide vanes 180 without abrupt directional changes that can cause turbulence. While being channeled by the exit guide vanes 180, the swirling tendency in the liquid may be gradually minimized by the gradual un-coiling of the exit guide vanes 180. Thus, the liquid may exit the exit guide vanes 180 with a substantially laminar flow to maximize efficient operation.

The coils 184 are formed on a core (not shown) to circumferentially surround the rotor 112 and form a winding. The coils 184 are separated from the rotor 112 by an air gap 188. The coils 184 are fixedly coupled with the exit guide vanes 180. In addition, the coils 184 may be fixedly coupled with the bearings 178 and the fin 182. The coils 184 may be fixedly coupled to the exit guide vanes 180, the bearings 178 and the fin 182 by, for example, glue or by being integrally formed therewith. In this embodiment, the coils 184 are positioned within the passageway 156, but are waterproof to avoid fluid communication with the flowing water. The coils 184 may be made waterproof by being, for example, potted with epoxy, injection molded with rubber or plastic, ultrasonically sealed or otherwise isolated from the water by a similar waterproofing mechanism. In an alternative embodiment, the coils 184 may be located outside the housing 142 as in the embodiment previously discussed with reference to FIGS. 7 and 8.

The coils 184 are also water proofed by the cap 186. The cap 186 is positioned to seal the end of the coils 184 that is adjacent the turbine rotor 164 as illustrated in FIG. 9. The cap 186 may be removably coupled to the coils 184 by threaded connection or may be fixedly coupled to the coils 184 by glue or integral formation therewith. The cap 186 is formed to partially surround the bearing 178 and radially extend a predetermined distance that is equal to the radius of the stator 114. The predetermined distance of the cap 186 extends closer to the inner wall of the housing 142 than the body 174 of the turbine rotor 164. The difference in the distance from the inner wall of the housing 142 to the cap 186 and the body 174 provides for circulation of the flowing water as will be hereinafter discussed.

During operation, water flowing through the inlet 144 and into the passageway 156 experiences a predetermined increase in velocity as the pressurized water flows through the channels 162. The flowing water is directed by the struts 160 to achieve a predetermined angle of incidence on the turbine blade 172 that imparts rotation on the rotor 112. Due to the differential depth of the channel 162, the turbine blade 172 and the cap 182, the flowing water is circulated into the cavity 176. Circulation of the flowing water through the cavity 176 provides cooling and lubrication of the adjacently positioned bearing 178.

In this embodiment, the rotor 112 rotates above about 5,000 revolutions-per-minute (RPM), such as in a range of between about 5,000 RPM and about 10,000 RPM or in a range between about 4,000 RPM and about 12,000 RPM. Rotation above about 5,000 RPM may be based on a liquid flow rate of about 3.78 liters/minute to about 11.35 liters/minute (about 1 to 3 gallons/minute) in a liquid pressure range of about 415 kPa to about 690 kPa (about 60 to 100 lbs./sq. inch). Rotation above about 5,000 RPM may also be based on a liquid flow rate of about 0.76 liters/minute to about 3.78 liters/minute (about 0.2 to about 1 gallons/minute) in a liquid pressure range of about 103.4 kPa to about 415 kPa (about 15 to 60 PSI). Depending on the physical properties of the liquid and/or manufacturing tolerances, the dimensions, the RPM, the pressure and the flow rates discussed herein may vary by as much as 10% to 20%.

To operate in this RPM range, the hydro-power generation system may be miniaturized to reduce inefficiency due to fluid impedance (or windage losses). As used herein, the term "fluid impedance" is defined as fluid friction and/or any other fluid effects that may compromise maximization of the transfer of kinetic energy to rotational energy.

Miniaturization of the hydro-power generation system minimizes surface areas that are subject to fluids as the rotor 112 rotates. In addition, the weight of the hydro-power generation system is minimized. For example, the diameter of the passageway 156 may be in a range of about 6.35 millimeters to about 51 millimeters (about 0.25 inches to about 2 inches). In addition, the depth of the channels 162 may be about 0.76 millimeters to about 2.54 millimeters (about 0.03 inches to about 0.1 inches) and the depth of the turbine blade 172 may be about 0.89 millimeters to about 3.8 millimeters (about 0.035 inches to about 0.15 inches.

The higher RPM that is achievable due to the miniaturization and fluid impedance reductions maximizes power generation efficiency. For example, the generator may produce between about 0.27 and 30 watts when rotating between about 5,000 and 10,000 RPM. In addition, the size (and weight) of the permanent magnet 168 may be dimensioned to optimize the power production of the hydro-power generation system 12.

The high RPM revolution of the rotor 112 within the stator 114 efficiently produces electricity when the hydro-power generation system 12 is operating. The hydro-power generation system 12 is capable of generating alternating current (AC). In alternative embodiments, the hydro-power generation system 12 may produce (DC) current. In another alternative embodiment, the hydro-power generation system 12 may be designed to produce both AC current and DC current by rectification and stabilization of the AC current. As previously discussed, the number of poles and the size and configuration of the coils 184 is dependent on the back pressure, the required RPM's and the target energy output of the hydro-power generation system 12.

Referring now to FIGS. 3, 6, 7, 8 and 9, another embodiment of the hydro-power generation system 12 discussed in conjunction with the embodiments of these figures is operable to supply multiple voltage and current levels. The multiple voltage and current levels are supplied by switching the coils of the hydro-power generation system 12 between a series configuration and a parallel configuration. Although not illustrated, a microprocessor or other similar control unit that can sense the voltage and current output of the hydro-power generation system 12 and the present voltage and current needs of the water treatment system 10 may be used to selectively switch the coils between series and parallel configurations. Alternatively, RPM may be used to selectively switch the coils. Selective switching of the coils may be applied to embodiments that produce direct current (DC) or alternating current (AC).

For example, some ultraviolet (UV) light sources require a relatively low predetermined alternating current for initial energization and a relatively high voltage level. Following initial energization, the UV light source requires a relatively high alternating current but requires a relatively low voltage level to remain energized. In a water treatment system for example, the UV light source may be a low pressure mercury lamp or a cold cathode lamp and the starting voltage and the running state voltage may be provided by a ballast. Alternatively, the hydro-power generation system 12 may provide a ballast function as described below and the ballast may be eliminated. The mercury lamp and/or the cold cathode lamp may remove bacteria and other impurities from water.

During operation, when the hydro-power generation system 12 is generating electricity, the coils may be selectively placed in a series configuration by the microprocessor. The series configuration generates a predetermined alternating current at a predetermined voltage level that is capable of initially energizing the UV light source with the startup voltage. Following initial energization of the UV light source, the coils are selectively reconfigured to a parallel configuration to provide a predetermined alternating current at a predetermined voltage level capable of maintaining energization of the UV light source with the running state voltage. Switching the coils of the hydro-power generation system 12, as previously discussed, may provide for various voltage and current requirements of any electrical device in any system supplied power by the hydro-power generation system 12.

In another embodiment, the hydro-power generation system 12 discussed in conjunction with the previously discussed embodiments may be provided with a plurality of taps representing different groups of coils formed into windings. The taps are operable to supply a plurality of different predetermined voltage levels by electrically connecting different numbers of coils to form the windings. The water treatment system 10 may be configured to operatively switch between the taps during operation using a microprocessor or some other similar device. Accordingly, in the UV light source example previously discussed, one tap may be used for initial energization to provide the startup voltage and another tap may be used for continuous operation to provide the running state voltage. In addition, different taps may be used on an ongoing basis to operate different electrical devices in the water treatment system 10 depending on the power requirements of the electrical devices. Tap switching may also be used to control the RPM of the generator. Where the RPMs are below a desired threshold, for example, taps may be adjusted to drop coils out thereby increasing the RPM. Tap switching of the hydro-power generation system 12 may also provide various voltage levels for any system supplied power by the hydro-power generation system 12.

In yet another embodiment of the hydro-power generation system 12 discussed in conjunction with the previously discussed embodiments, the back electromagnetic force (EMF) that is present is advantageously reduced. As known in the art, the back EMF of a permanent magnet generator is increased by flux concentrators that are formed by metal laminations in the core of the generator. The flux concentrators are operable to improve the generating efficiency of the generator, but supply back EMF that must be overcome to rotate the rotor.

In the application of the hydro-power generation system 12 to a water treatment system 10, some UV light sources have varying power requirements during startup and operation. By using the previously discussed embodiments of the hydro-power generation system 12 and not include the flux concentrators, the operational requirements of the UV light source may be met.

During operation, prior to energization of the water treatment system 10, the rotational load (the back EMF) on the hydro-power generation system 12 may be relatively low. The rotational load may be relatively low since the hydro-power generation system 12 of this embodiment does not include the flux concentrators and the water treatment system 10 is not using power. The elimination of the flux concentrators results in a reduction in cogging torque thereby allowing quick spin-up of the generator. As such, when water flows through the hydro-power generation system 12, the rotor is operable to accelerate to a predetermined relatively high RPM in a relatively short period of time.

The relatively high RPM supplies a predetermined voltage (startup voltage) at a predetermined alternating current (AC) that is capable of initially energizing, for example, the UV light source in the water treatment system 10. Following initial energization of the UV light source, the rotational load on the hydro-power generation system 12 is increased thereby slowing the RPM of the rotor. The slower RPM of the rotor provides a predetermined low voltage (running state voltage) with a corresponding predetermined alternating current (AC) thereby allowing continued energization of the UV light source. The reader should recognize that the "instant-on" capability provided by the hydro-power generation system 12 of this embodiment may eliminate the need for energy storage devices to power the UV light source in the water treatment system 10 since the UV light source will be energized at almost the same time the water begins to flow.

Figure 11:
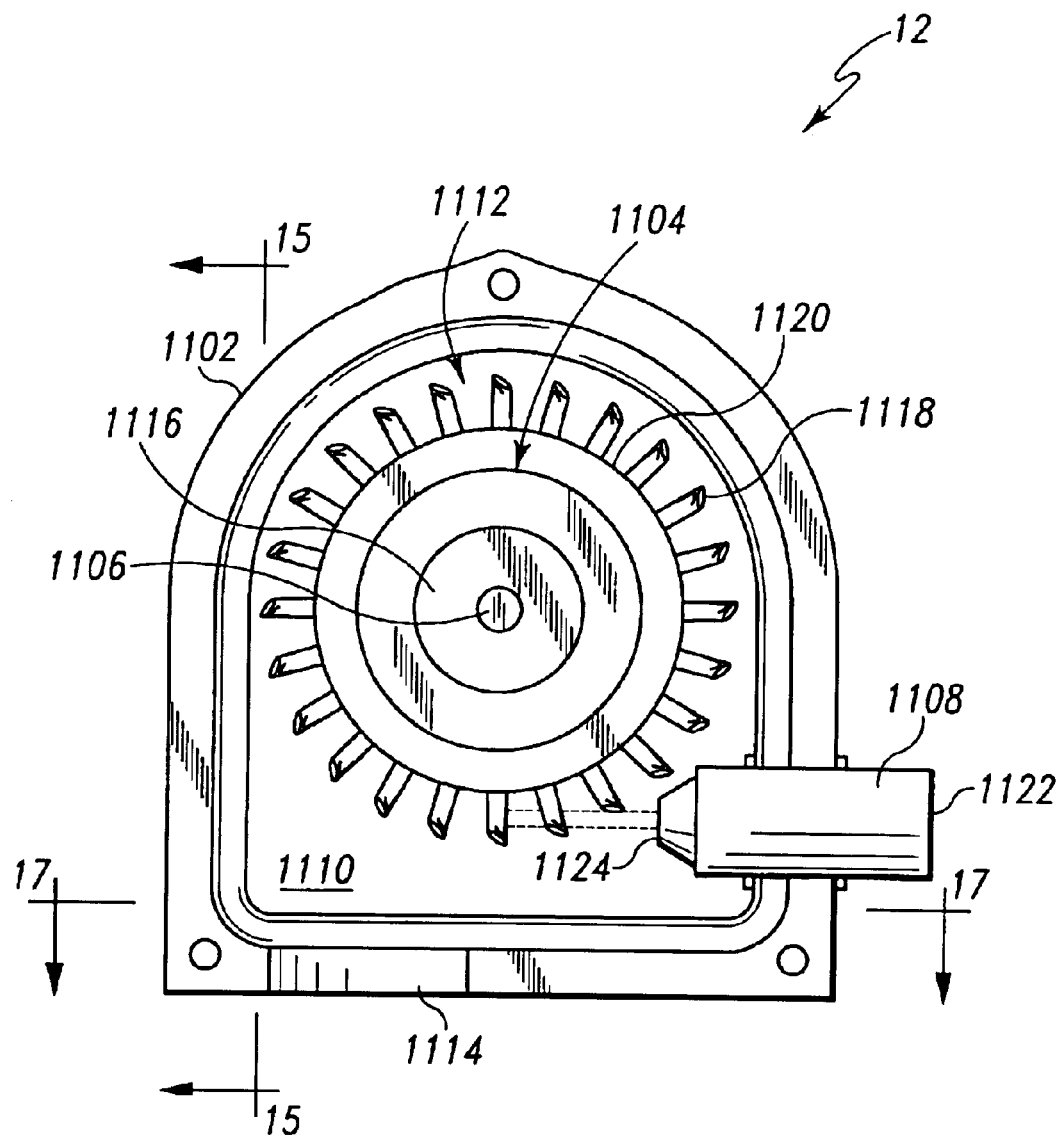
FIG. 11 represents a side view of another embodiment of the hydro-power generation system.

FIG. 11 is another embodiment of the hydro-power generation system 12 depicted in a partial cross-section view. Similar to the previous embodiments, the hydro-power generation system 12 may be used in a water treatment system 10. In addition, the hydro-power generation system 12 may be included in any other form of system with flowing pressurized liquid. The hydro-power generation system 12 may also include features of a water treatment system such as a UV light source, filters, electronics, etc.

The illustrated hydro-power generation system 12 includes an outer housing 1102 depicted with a side cover removed. In addition, the hydro-power generation system 12 includes an inner housing 1104, a centering rod 1106 and a nozzle 1108. The outer housing 1102 may be plastic, metal, carbon fiber or other rigid material and includes a cavity 1110. The cavity 1110 is an airspace that is sized to accommodate the inner housing 1104 without the inner housing 1104 contacting an interior surface 1112 of the outer housing 1102. Also included in the outer housing 1102 is an outlet 1114. The outlet 1114 may be an aperture that allows liquid present in the outer housing 1102 to drain by gravity from the cavity 1110 to maintain the airspace during operation.

The inner housing 1104 may be generally cylindrical and form of plastic, metal, carbon fiber or other similar material. The inner housing 1104 may be mounted in the outer housing 1102 to surround at least a portion of the centering rod 1106 within the cavity 1110 of the outer housing 1102. The centering rod 1106 may be fixedly coupled with the outer housing 1102 and extend into the inner housing 1104. The centering rod 1106 may be any rigid, longitudinally extending material such as stainless steel.

A plurality of bushings 1116 may be coupled with the inner housing 1104 and surround the centering rod 1106. Each of the bushings 1116 may be a sleeve formed from plastic, metal or other similar material. The bushings 1116 may be formed with an aperture to accommodate the centering rod 1106, and an outer surface formed to fit within an aperture in the outer surface of the inner housing 1104. The aperture in the bushing 1116 may be large enough to allow the bushing 1116 to rotate around the centering rod 1106 within the outer housing 1102 without contacting the centering rod 1106. The outer surface of the bushing 1116 may be fixedly coupled with the outer surface of the inner housing 1104 such that the inner housing 1104 and the bushing 1116 rotate together. Alternatively, the bushing 1116 and the inner housing 1104 may rotate independently around the centering rod 1106.

The inner housing 1104 may also include a plurality of paddles 1118 fixedly coupled and extending outwardly from an outer surface 1120 of the inner housing 1104. The paddles 1118 may be formed of plastic, carbon fiber, metal or other similar material. The paddles 1118 may be positioned perpendicular to the outer surface 1120 of the inner housing 1104 such that each of the paddles 1118 are located adjacent to the nozzle 1108 at some point as the inner housing 1104 rotates.

The nozzle 1108 may be mounted to extend into the cavity 1110 between the inner housing 1104 and the outlet 1114 as illustrated. Similar to the nozzle 14 previously discussed with reference to FIGS. 1–5, the nozzle 1108 increases the velocity of pressurized liquid. Pressurized liquid supplied to a nozzle inlet 1122 at a first velocity flows through the nozzle 1108 and is discharged from a nozzle outlet 1124 at a second velocity that is substantially higher than the first velocity. Liquid discharged into the cavity with the nozzle 1108 is directed through the air space at the paddles 1118.

FIG. 12 is an end view of the nozzle 1108 viewed from the nozzle inlet 1122 (FIG. 11). The nozzle 1108 includes a passageway 1202 that is an axial bore that reduces in diameter toward the nozzle outlet 1124 (FIG. 11). Included in the passageway 1202 is a rib 1204. The rib 1204 is coupled with an inner surface 1206 of the nozzle 1108 and extends outwardly from the inner surface 1206 towards a central axis 1208 of the nozzle 1108.

FIG. 13 is a cutaway bottom view of the nozzle 1108 depicted in FIG. 12 that includes the rib 1204. The passageway 1202 through the nozzle 1108 includes a first angled section 1302 adjacent to the nozzle inlet 1122 followed by a first straight section 1304, a tapered section 1306, a second angled section 1308, and a second straight section 1310 that forms the nozzle outlet 1124. The passageway 1202 may be a predetermined entry diameter such as about 10.8 millimeters at the nozzle inlet 1122. Within the first angled section 1302, the diameter of the passageway 1202 may uniformly reduce in diameter toward the nozzle outlet 1124 at a predetermined angle (θ) with respect to the central axis 1208, such as about 20 degrees.

At a first straight section 1304, the diameter of the passageway 1202 may be a predetermined first nozzle diameter such as about 5.8 millimeters. Through the first straight section 1304 of the passageway 1202, the interior surface 1206 may be about parallel with the central axis 1208 and is therefore maintained at the first nozzle diameter. In the tapered section 1306, the interior surface 1202 may have a radius of curvature. The radius of curvature may form a portion of a circle with a predetermined radius, such as about 8.7 millimeters. The diameter of the passageway 1202 in the second angled section 1308 may reduce at a uniform rate toward the nozzle outlet 1124 at a predetermined angle (θ) with respect to the central axis 1208, such as about 20 degrees. The second straight section 1310 may form the nozzle outlet 1124 by maintaining the passageway 1202 at a predetermined second nozzle diameter such as about 1.85 millimeters.

The first and second nozzle diameters may be determined based on the available range of pressure of the liquid supplied to the nozzle 1108. In one example, the diameter of the first straight section 1304 may remain relatively unchanged and the diameter of the second straight section 1310 may be varied based on the pressure of the liquid introduced to the nozzle 1108. For example, the diameter of the first straight section 1304 may remain about 5.8 millimeters and the second straight section 1310 may be formed to be about 1.9 millimeters or less. Accordingly, the diameter of the second straight section 1310 (the nozzle outlet 1124) of the nozzle 1108 is about 33% or less of the diameter of the first straight section 1304 of the nozzle 1108.

In another example, the second straight section 1310 may be formed in a range between about 0.8 millimeters and about 1.9 millimeters (between about 0.03 and 0.075 inches) for use with liquid pressurized at the nozzle inlet 1122 between about 34 kPa and 850 kPa (between about 5 and 125 PSI). In this example, the nozzle 1108 may be between about 14% and about 33% of the diameter of the first straight section 1304 of the nozzle 1108. The resulting flow rate through the nozzle 1108 for this example may be in a range of about 0.44 liters/minute at 34 kPa to about 4.16 liters/minute at about 850 kPa (about 0.115 gallons-per-minute to about 1.1 gallons-per-minute).

The rib 1204 may be any configuration to minimize swirling and other non-laminar behavior of the liquid flowing through the passageway 1102. The illustrated rib 1204 begins at the nozzle inlet 1122 and extends a predetermined distance along the central axis 1208 through the first angled section 1302, the first straight section 1304, and into the tapered section 1306. Although depicted as having a uniform width, in other examples, the rib 1204 may include one or more tapered width sections, bulbs, curves or any other configuration to promote laminar flow of the liquid through the nozzle 1108. In addition, the length of the rib 1204 may be shorter or longer than illustrated to best eliminate swirling of the liquid flowing through the passageway 1202.

FIG. 14 is a cutaway side view of the nozzle 1108 that includes the rib 1204 depicted in FIG. 12. The example rib 1204 extends outwardly from the interior surface 1206 towards the central axis 1208 a determined first distance at the nozzle inlet 1122 of the passageway 1202. The distance that the rib 1204 extends from the interior surface 1206 gradually diminishes to zero as the rib 1204 extends along the central axis 1208 towards the nozzle outlet 1124. In the illustrated example, the rib 1204 is tapered to extend a distance that becomes progressively further from the central axis 1208 as the rib 1204 extends towards the nozzle outlet 1124 along the central axis 1208. In addition, the distance between the interior surface 1206 and the central axis 1208 becomes less toward the nozzle outlet 1124 further tapering the rib 1204 as illustrated. In other examples, the rib 1204 may form any other shape to reduce swirling effects and promote laminar flow of the liquid through the nozzle 1108.

Referring again to FIG. 11, during operation, liquid flowing through the nozzle 1108 may be maintained with laminar flow while the velocity of the liquid is accelerated within the nozzle 1108. The liquid may be discharged from the nozzle 1108 in a stream at high velocity. Due to the substantially laminar flow, the stream of liquid may remain a well defined stream of about the same diameter as the nozzle outlet 1124 following discharge. Thus, liquid spray produced by the stream of liquid is minimized and the kinetic energy of the flowing liquid may be concentrated in a relatively small area.

The stream of liquid may be directed at the paddles 1118. Upon striking the paddles 1118, the kinetic energy present in the liquid may be efficiently transferred to rotational energy of the inner housing 1104. As the inner housing 1104 rotates, each of the paddles 1118 may enter the stream of high velocity liquid discharged from the nozzle 1108 and receive substantially all the kinetic energy present in the flowing stream of liquid.

Once the kinetic energy is extracted from the liquid, the liquid may fall by gravity to the outlet 1114 and is channeled out of the outer housing 1102. Due to the channeling, the outer housing 1102 remains substantially empty of liquid. Although some liquid is present due to the constant flow of liquid discharged from the nozzle 1108, the channeling may maintain the level of liquid in the outer housing 1102 low enough that the nozzle 1108 and the inner housing 1104 are not submerge in the liquid. Accordingly, the nozzle 1108 and the inner housing 1104 operate in an airspace within the outer housing 1102 with minimized fluid impedance losses.

Some of the liquid may temporarily remain on the paddles 1118, and be thrown by the rotational force of the inner housing 1104 onto the inner surface 1112 of the outer housing 1102. In addition, some of the liquid may impact the paddles 1118 and be deflected onto the inner surface 1112.

The inner surface 1112 may be formed with ducting to minimize liquid spray within the cavity 1110. Minimization of liquid spray within the cavity 1110 minimizes fluid impedance losses of the rotating inner housing 1104 by keeping excess liquid away from the rotating inner housing 1104. The ducting included on the inner surface 1112 may also be formed with a swirl pattern designed to efficiently collect the liquid spray and channel the liquid to the outlet 1114. Accordingly, the cavity 1110 remains substantially empty of liquid and substantially filled with air (or some other gas) during operation such that the nozzle outlet 1124 of the nozzle 108 is not submerged in the liquid.

FIG. 15 illustrates one example of the inner surface 1112 in a cross-sectional view of the outer housing 1102 of FIG. 11. The inner surface 1112 includes ducting in the form of a plurality of fingers 1502 extending outward from the inner surface 1112 towards the inner housing 1104 (FIG. 11). Each of the fingers 1502 may be formed as individual pyramid shaped members. In other examples, the fingers 1502 may be grooves, rings, struts, tracks or any other form of irregularity in the inner surface 1112 of the outer housing 1102. The fingers 1502 may be positioned in a determined pattern. The pattern may be a swirl pattern based on modeling or analysis of the liquid flung from the rotating inner housing 1104 and paddles 1118 to minimize the liquid spray and maximize channeling of the liquid to the outlet 1114 (FIG. 11).

The fingers 1502 may minimize liquid spray of the liquid that contacts the interior surface 1112 of the outer housing 1102. In addition, the fingers 1502 may be configured to channel the water to a center channel 1504 and outer channels 1506 included in the outer housing 1102. The center channel 1504 and outer channels 1506 may be v-shaped grooves or some other form of conduit to channel the liquid toward the outlet 1114 (FIG. 11). The interior surface 1112 may also include a plurality of branch channels 1508. The branch channels 1508 may be arcuate pathways in the interior surface 1112 that channel the liquid to the center channel 1504 or the outer channels 1506. The channels may also be positioned in a swirl pattern based on modeling or analyzing the liquid flung from the rotating inner housing 1104 to minimize the liquid spray and maximize channeling of the liquid to the outlet 1114 (FIG. 11).

The fingers 1502 may be positioned along each of the branch channels 1508. Liquid that impacts on the fingers 1502 may be "captured" by the fingers 1502. The liquid may flow off the fingers 1502 into the branch channels 1508 and then into the center channel 1504 or the outer channels 1506.

Figure 16:
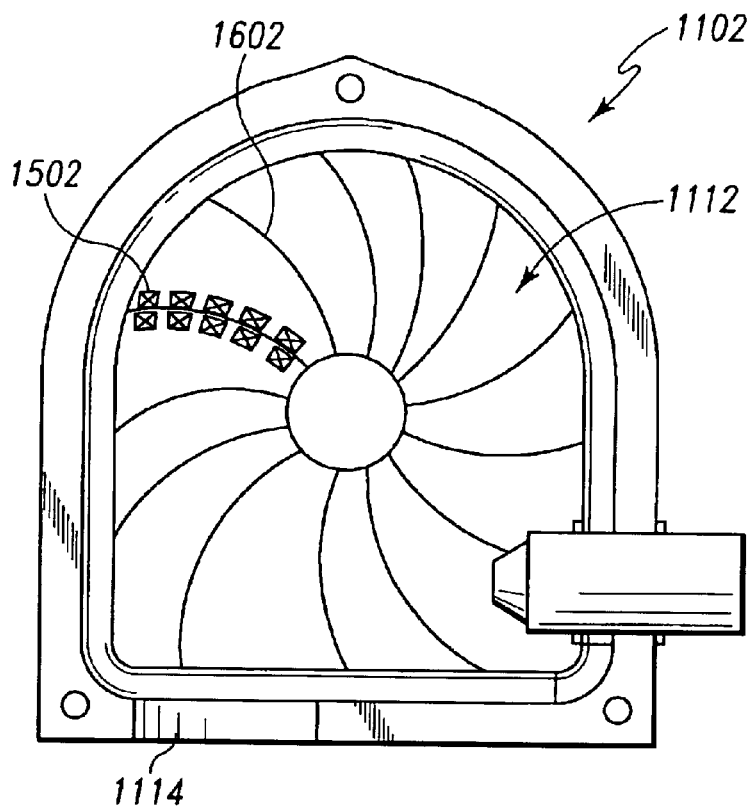
FIG. 16 represents a side view of the hydro-power generation system illustrated in FIG. 11 with an inner housing removed.

FIG. 16 is a side view of the outer housing 1102 depicted in FIG. 11 with the inner housing 1104 and the centering rod 1106 removed for purposes of illustration. The interior surface 1112 of the outer housing 1102 includes the fingers 1502 placed along a plurality of branch channels 1602 forming arcuate pathways for liquid in the interior surface 1112. Liquid "captured" by the fingers 1502 flows off the fingers 1502 into the branch channels 1602 and is channeled to the outer channels 1506 (FIG. 14) and/or the outlet 1114.

Figure 17:
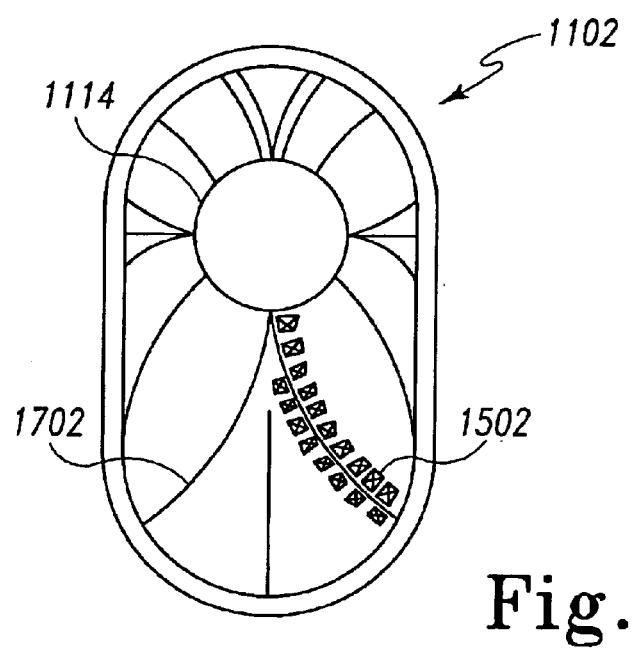
FIG. 17 represents a cross-sectional view of a bottom portion of the outer housing of the hydro-power generation system illustrated in FIG. 11 taken along line 17—17.

FIG. 17 is a cross-sectional view of the bottom of the outer housing 1102 illustrated in FIG. 11 that includes the outlet 1114. The bottom of the housing 1102 similarly includes a plurality of branch channels 1702 that are arcuate passages directing the liquid to the outlet 1114. The fingers 1502 may be placed along each of the branch channels 1702.

FIG. 18 is an exploded perspective view of the inner housing 1104 illustrated in FIG. 11 that includes the centering rod 1106. Also included in the inner housing 1104 are the bushings 1116, the paddles 1118, a first hub 1802, a second hub 1804, a rotor 1806 and a stator 1808. The centering rod 1106 may extend through the inner housing 1104 along a central axis 1812 and cooperatively operate with the bushings 1116 to provide a centering function for the stator 1808. The bushings 1116 may be formed to axially fit within a bushing aperture 1816 formed in a first end of each of the first and second hubs 1802 and 1804.

The first and second hubs 1802 and 1804 may be formed of plastic, carbon fiber or any other rigid material. Each of the first and second hubs 1802 and 1804 may be generally cylindrical and form a cavity having an open end 1818. The open end 1818 may be at a second end opposite the first end that includes the bushing aperture 1816. The first and second hubs 1802 and 1804 may be coupled together at the open ends 1818 to form the outer surface 1120 (FIG. 11) of the inner housing 1104.

Each of the first and second hubs 1802 and 1804 include a retaining ring 1820. The retaining ring 1820 includes a plurality of lugs 1822 extending outwardly around the edge of the open end 1818 parallel with the central axis 1812. A plurality of slots 1824 may be formed between each of the lugs 1822 in the retaining ring 1820. The lugs 1822 may be aligned to adjacently contact each other when the first and second hubs 1802 and 1804 are coupled at the open ends 1818. Thus the slots 1824 may also be aligned between the first and second hubs 1802 and 1804 to form apertures.

The first and second hubs 1802 and 1804 also include a plurality of vents 1826 that may be sequentially disposed concentrically around the outer surface of the inner housing 1104. The vents 1826 form apertures that allow liquid communication between the cavity inside the inner housing 1104 and the outside of the inner housing 1104. Accordingly, liquid may enter or exit the inner housing 1104 through the vents 1826.

When the inner housing 1104 rotates, liquid in the inner housing 1104 flows out through the vents 1826 due to the rotation-related centrifugal force that is created. Thus, fluid impedance losses due to liquid inside the inner housing 1104 are minimized by ongoing evacuation of the liquid through the vents 1826 when the inner housing 1104 rotates at high RPM. The rotating inner housing 1104 may therefore maintain the cavity substantially empty of liquid. The cavity may be substantially dry and filled with air (or some other gas). Although the cavity may be wet, the cavity may remain absent amounts of liquid of sufficient quantity to affect efficient operation. The vents 1826 may also provide airflow through the inner housing 1104 for cooling.

Within the cavity formed in each of the first and second hubs 1802 and 1804 is a plurality of keepers 1828 extending outward from the first and second hubs 1802 and 1804 towards the central axis 1812. The keepers 1828 may be positioned a determined distance apart to form a plurality of notches 1830 between the keepers 1828. The keepers 1828 may be formed as an integral part of the first and second hubs 1802 and 1804. Alternatively, the keepers 1828 may be formed separately of plastic, metal, carbon fiber or any other rigid material that may be coupled with an interior surface of each of the first and second hubs 1802 and 1804 within the respective cavities.

The rotor 1806 may include a keeper ring 1834 and a magnet 1836. The keeper ring 1834 may be a cylindrical sleeve formed with iron or other similar ferrous (or non-ferrous) material. When the first and second hubs 1802 and 1804 are coupled together, a portion of the keeper ring 1834 may be positioned in the cavity of each of the first and second hubs 1802 and 1804. The keeper ring 1834 may couple with keepers 1828 within each of the first and second hubs 1802 and 1804 such that the keeper ring 1834 rotates with the inner housing 1104. The keeper ring 1834 may be configured as a flux concentrator to operate with the magnet 1836 to improve generator efficiency.

The magnet 1836 may be coupled with the keeper ring 1834, and also rotate with the inner housing 1104. The magnet 1836 may be a permanent magnet, such as a sintered or bonded neodymium iron boron (NdFeB) rare earth magnet. The magnet 1836 may be formed as a continuous single structure with the desired number of north and south poles configured along the structure. Alternatively, a plurality of individual magnets may be aligned and coupled with the keeper ring 1834.

The back EMF of the generator may be advantageously reduced by coupling the magnet 1836 directly with the keepers 1828. Thus, the keeper ring 1834 may be eliminated. As previously discussed, reduction in the back EMF allows for faster acceleration, which may be advantageous with some loads, such as providing "instant on" capability of a UV light source.

The stator 1808 may be formed with a plurality of poles 1840 wound with one or more stationary windings (not shown) as previously discussed. The poles 1840 may be metal laminations that are coupled with a mounting plate 1842. The mounting plate 1842 may be a metal, plastic or any other rigid material and may be coupled with the centering rod 1106. The stator 1808 may be positioned in the cavity formed by the first and second hubs 1802 and 1804 such that the magnet 1836 is positioned around the stator 1808 adjacent the poles 1840 with an air gap in between.

The stator 1808 may be operated wet or dry since the winding(s) may be sealed with a non-conducting material, such as an enamel coating on the wire used to form the windings. Alternatively, the winding(s) may be over-molded with plastic, rubber or some other waterproof material. In addition to providing water resistance, such over-molding may also reduce edges and other features of the stator 1808 that may contribute to fluid impedance losses when the inner housing 1104 is rotated at high velocity around the stator 1808.

The combination of the rotor 1806 and the stator 1808 may form a generator that generates three phase power. Alternatively, the generator may generate single phase power. Power generated by the generator may be provided on a power supply line 1844. The power supply line 1844 may be electrically connected to the winding(s) of the stator 1808. The power supply line 1844 may be routed through a passage extending along the central axis 1812 through the centering rod 1106. In addition to power, the rotation of the rotor and/or the power produced may be monitored to perform flow-based measurements.

The air gap between the stator 1808 and the magnet 1836 may be maintained by the magnetic field of the magnet 1836 in combination with the centering rod 1106 and the surrounding bushings 1116. The stator 1808 may be coupled with the centering rod 1106. Accordingly, upon rotation of the inner housing 1104, and therefore the rotor 1806, the rotating magnetic field induces the production of electric power in the winding(s) of the stator 1808.

During operation, the inner housing 1104 may be rotated at relatively high revolution-per-minute (RPM), such as above 5000 RPM, by a single high-velocity stream of liquid. The relatively high RPM may be achieved due to the relatively small size of the inner housing 1104 and minimized fluid impedance losses. The diameter of the generally cylindrical inner housing 1104 may be less than about 40 millimeters, such as in a range of about 40 millimeters to about 10 millimeters. Since the diameter of the nozzle outlet 1124 (FIG. 11) of the nozzle 1108 (FIG. 11) may be in a range of about 1.9 millimeters to about 0.8 millimeters, the diameter of the nozzle outlet 1124 is between about 4.75% and about 8% of the diameter of the housing 1104.

The rotational speed of the inner housing 1104, and therefore the amount of power produced by the generator, may be based on the velocity of the liquid discharged by the nozzle 1108 (FIG. 11) and the diameter of the inner housing 1104. Thus, for a range of diameters of the nozzle outlet 1124 (FIG. 11) of the nozzle 1108 (FIG. 11) and a range of diameters of the inner housing 1104 within a range of liquid pressures and flow rates, a range of power may be output.

For example, a range of diameter of the nozzle outlet 1124 of the nozzle 1108 between about 0.8 millimeters and about 1.9 millimeters may discharge between about 0.44 liters/min and about 4.16 liters/min (about 0.115 gal/min and about 1.1 gal/min). The flow rate may be based on a pressure range at the nozzle inlet 1122 (FIG. 11) between about 34 kPa and about 413 kPa (about 5 lb/sq. in and about 60 lb/sq. in). The resulting rotation of the inner housing 1104 may produce between about 0.25 watts and about 30 watts of power. Power from the generator in this example range can drive a UV lamp or an electronics assembly directly and/or may be rectified to charge an energy storage device such as a capacitor, a super capacitor, an ultra capacitor and/or a battery.

The magnet 1836 may also provide balancing and alignment of the inner housing 1104. The weight of the magnet 1836 may be configured to spin balance the rotation of the inner housing 1104 to increase efficiency. Thus, the inner housing 1104 may rotate smoothly at a high RPM with minimized vibration or other effects associated with unbalanced rotation. As previously discussed, the weight of the magnet 1836 may also be minimized due to the efficient power production at high RPM.

In addition, the magnetic field of the magnet 1836 may maintain the alignment of the rotor 1806, and therefore the inner housing 1104, with the stator 1808. The substantially equally distributed magnetic field of the magnet 1836 may axially align the rotor 1806 and stator 1808. Accordingly, the inner housing 1104 may also be axially aligned with the centering rod 1106. The bushings 1116 and the centering rod 1106 may assist in axially aligning the inner housing 1104, however the inner housing 1104 may be suspended in axial alignment with the centering rod 1106 by the magnetic field of the magnet 1836. Thus, frictional losses between the surrounding rotating bushings 1116 and the non-rotating centering rod 1106 may be minimized. In addition, the magnetic field may maintain the positional relationship of the inner housing 1104 with the stator 1808 when the hydro power generator 12 is mounted vertically, horizontally, etc. without the use of stays, latches or any other mechanisms to maintain relative positioning.

As illustrated in FIGS. 11 and 18, the paddles 1118 may form a ring concentrically surrounding the inner housing 1104. The paddles 1118 may be individually manufactured parts that are coupled with the outer surface of the inner housing 1104. Each of the paddles 1118 may be maintained in position in one of the notches 1824 to form the ring when the first and second hubs 1802 and 1804 are coupled together. Alternatively, the paddles 1118 may be individually coupled or coupled as a group to the first and/or second hubs 1802 and 1804 by gluing, welding, friction fit or any other mechanism.

The paddles 1118 may be individually manufactured and then assembled in a ring to reduce costs and improve manufacturability. In addition, the diameter of the inner housing 1104, and therefore the diameter of the ring of the paddles 1118 may be varied without substantial changes to the geometry of the individual paddles 1118. The configuration of each of the individual paddles 1118 as well as the retainer rings 1820 in each of the first and second hubs 1802 and 1804 may cooperatively operate to maintain the position of the paddles 1118 in the notches 1824.

FIG. 19 is a perspective view of an example one of the paddles 1118 illustrated in FIG. 18. The illustrated paddle 1118 may be generally concaved and includes a base 1902, a first paddle section 1904, a second paddle section 1906 and a slot 1908. The base 1902 may be formed to fit within adjoining slots 1824 (FIG. 18) of the first and second hubs 1802 and 1804 (FIG. 18). The base 1902 may include a lower surface 1912 and a foot 1914. The lower surface 1912 may be curved with a predetermined radius of curvature similar to the radius of curvature of the interior surface of the first and second hubs 1802 and 1804 (FIG. 18). The foot 1914 may be generally triangular in shape and include a first angled surface 1916, a second angled surface 1918 and a face surface 1920.

Referring now to FIGS. 18 and 19, when the paddle 1118 is mounted in the inner housing 1104, the base 1902 may be disposed in adjacently positioned notches 1824 of each of the first and second hubs 1802 and 1804. The foot 1914 of each paddle 1118 may be held in the notches 1824 by the lugs 1822 on the first and second hubs 1802 and 1804. In the illustrated example, the first and second angled surfaces 1916 and 1918 may be adjacently contacting one of the lugs 1822 on the each of the first and second hubs 1802 and 1804, respectively. In addition, the face surface 1920 may be adjacently contacting an adjacently mounted paddle 1118.

FIG. 20 is a cross-sectional top view of the paddle 1118 of FIG. 19 that illustrates the first and second paddle sections 1904 and 1906 and the foot 1914. Also illustrated is a back surface 2002 of the paddle 1118. When the paddle 1118 is mounted on the inner housing 1104 (FIG. 11), the back surface 2002 may be adjacently contacting the face surface 1920 (FIG. 19) of the foot 1914 of an adjacently mounted paddle 1118. Thus, the base 1902 (FIG. 19) of the paddle 1118 is effectively held in place by the combination of the lugs 1822 (FIG. 18) and the paddles 1118 positioned adjacently in the ring of paddles 1118. The base 1902 of each of the paddles 1118 may form a portion of an unbroken concentric ring adjacent to the outer surface of the inner housing 1104. The paddles 1118 may be held in position by friction fit, gluing, welding or any other coupling mechanism or material.

Referring again to FIG. 19, the first and second paddle sections 1904 and 1906 may each provide a separate cup or depression capable of accepting a high velocity stream of liquid. As best illustrated in FIG. 20, each of the first and second paddle sections 1904 and 1906 may be elliptical to optimize the flow of liquid striking the paddle sections 1904 and 1906. The slot 1918 allows the stream of liquid to efficiently strike each of the paddles 1118 as the inner housing 1104 (FIG. 11) rotates at high RPM.

The previously described hydro-power generation system 12 may also include capabilities of a water treatment system. In one example, the hydro-power generation system may be mounted to a faucet or other plumbing fixture. The inlet of the faucet mounted hydro-power generation system 12 may be coupled to the water outlet end of the faucet. The hydro-power generation system 12 may include a carbon filter and an ultraviolet (UV) lamp in addition to the previously discussed power generation capability. In addition, the hydro-power generation system 12 may include a liquid diverter to bypass the hydro-power generation system 12 when treated water is not desired. The hydro-power generation system 12 may also include a processing device, such as a microprocessor, to monitor the UV lamp and filter life. The hydro-power generation system 12 may provide liquid flow detection as previously discussed for use in monitoring filter life. In addition, end of life of the UV lamp may be monitored with the microprocessor. Further, switching of taps and/or coils may be dynamically directed by the microprocessor to provide a first voltage for initial energization of the UV lamp and continued energization of the UV lamp as previously discussed.

Other applications involving a pressurized flow of liquid that require a power source may also be provided by the hydro-power generation system 12. For example, plumbing fixtures with motion detectors, electrically operated valves or any other device requiring an electric power source to operate may be included as part of the hydro-power generation system 12.

Figure 21:
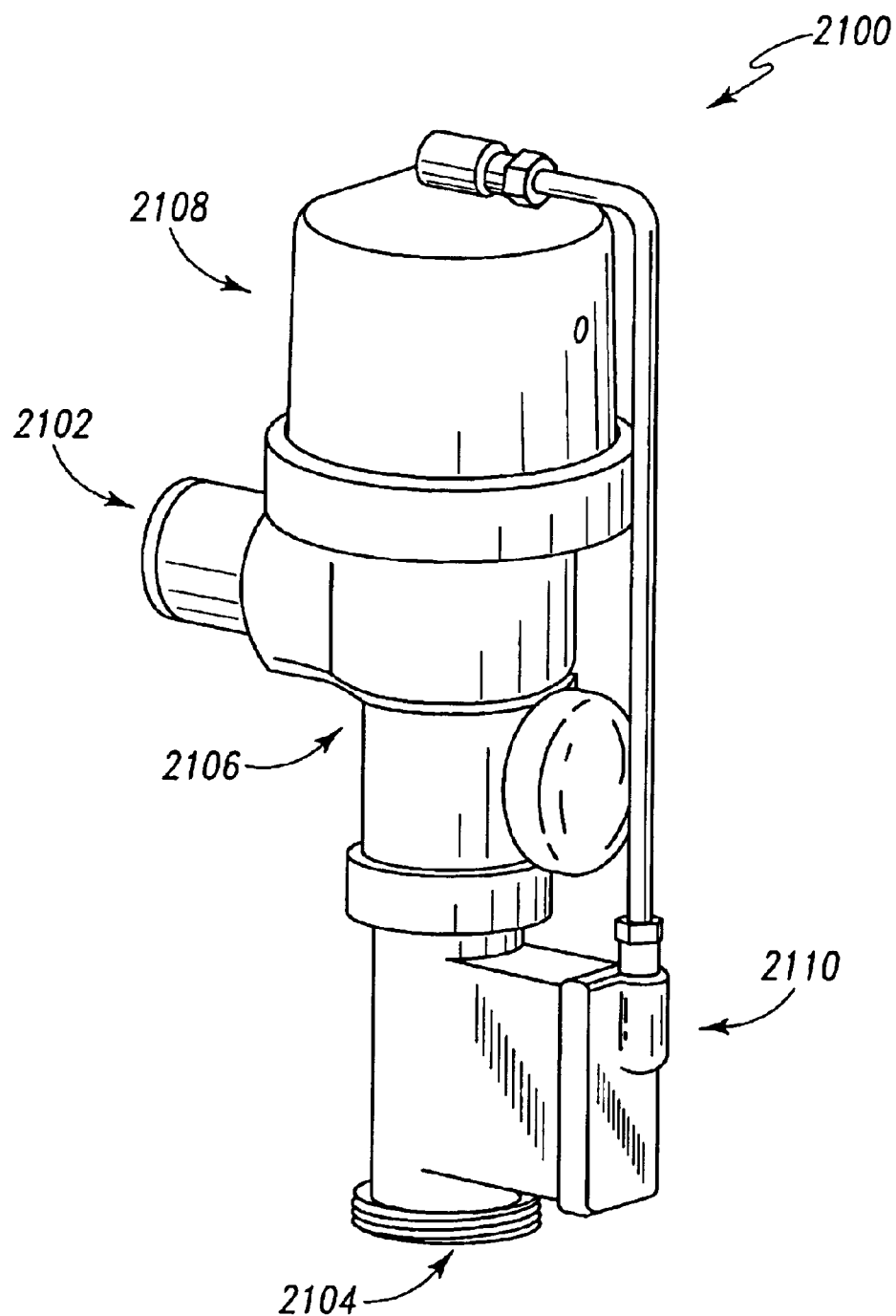
FIG. 21 represents a perspective view of a hydro-power generation system that includes a plumbing fixture.

FIG. 21 is perspective view of an example plumbing fixture 2100 for a toilet, such as a stool or urinal that is included as part of the hydro-power generation system. The plumbing fixture 2100 includes a water inlet 2102 for receiving water and a water outlet 2104 for discharging water. The plumbing fixture 2100 also includes a valve module 2106, an electronics module 2108 and a power generation module 2110. In other examples, a faucet, a shower or any other plumbing fixture having a control valve, a water inlet and a water outlet may similarly be included in the hydro-power generation system. As used herein, the term "plumbing fixture" is defined to include lavatory related devices such as faucets, toilet flush mechanisms, sprayers and showers. In addition, plumbing fixtures may include sprinklers, fountains and any other devices and mechanisms used to control and/or channel the flow of liquids at pressures less than about 1034 kPa (about 150 lbs./sq. inch).

Figure 22:
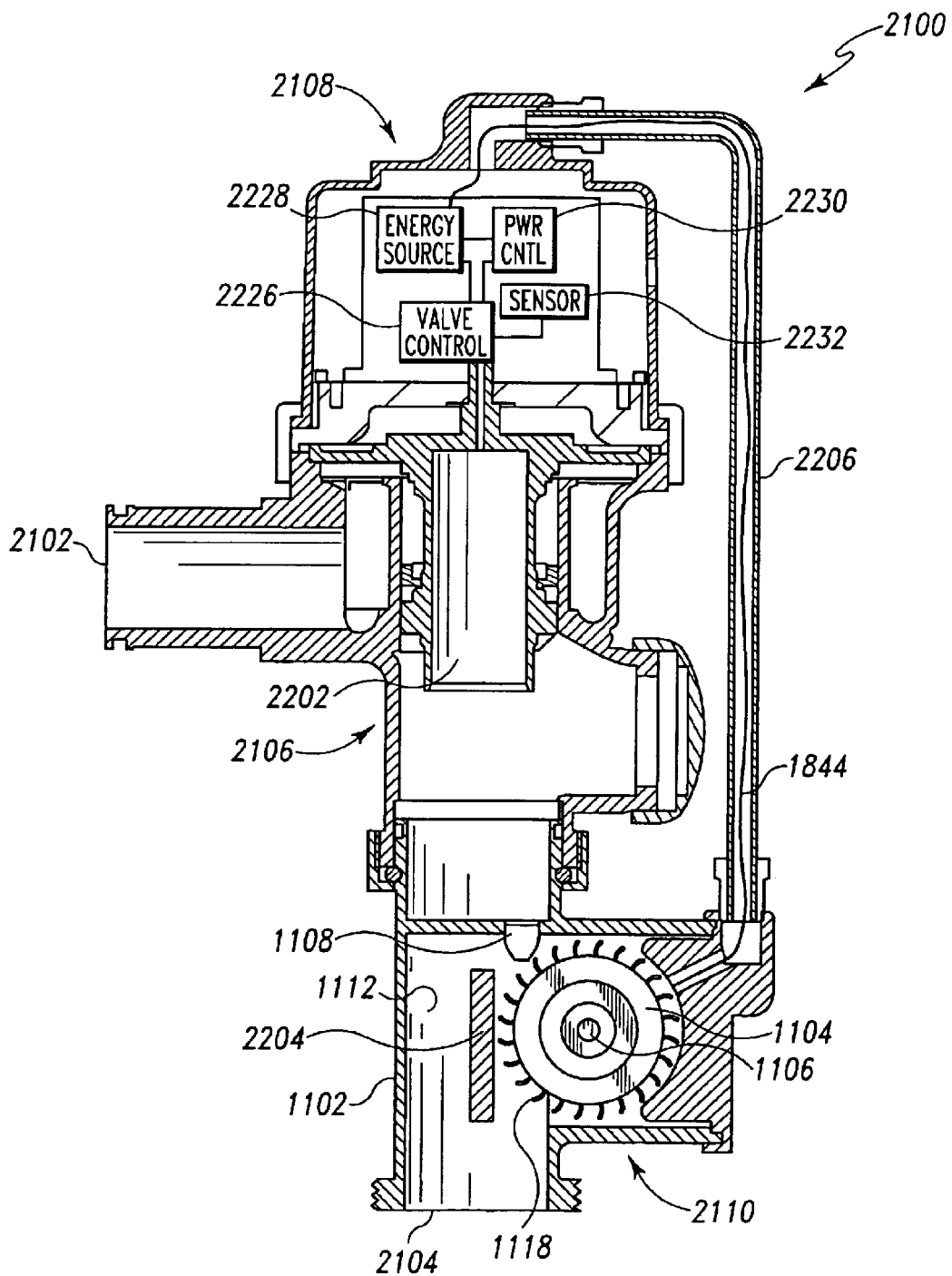
FIG. 22 represents a cross-sectional side view of the plumbing fixture illustrated in FIG. 21.

FIG. 22 is a cut away side view of the example plumbing fixture 2100 illustrated in FIG. 21 that includes the inlet 2102, the outlet 2104, the valve module 2106, the electronic module 2108 and the power generation module 2110.

The valve module 2106 includes an electrically operated valve 2202. The electrically operated valve 2202 may be any electro-mechanical valve device capable of being actuated with voltage and current to open and close a liquid flow path. Upon energization, the electrically operated valve 2202 may move to a position that opens a liquid flow path through the valve module 2106. When the liquid flow path is opened, pressurized liquid supplied at the inlet 2102 may flow through the valve module 2106 and the power generation module 2110 to the outlet 2104. Upon de-energization, the electrically operated valve 2202 may close off the liquid flow path stopping the flow of liquid through the valve module 2106 and the power generation module 2110.

The power generation module 2110 includes the outer housing 1102, the inner housing 1104, the centering rod 1106 and the nozzle 1108 that are similar to the embodiments discussed with reference to FIGS. 11–20. Accordingly, a detailed discussion of these features will not be repeated. In other examples, features and/or components similar to any of the other previously discussed embodiments may be included in the power generation module 2110. The outer housing 1102 also includes a scupper 2204 to channel liquid toward the outlet 2104 following impact with the inner housing 1104. The inner housing 1102 may be removed from the plumbing fixture as a unit for maintenance and/or repair. Pressurized liquid provided to the inlet 2102 is accelerated to a high velocity by the nozzle 1108 and directed in a stream of liquid at the paddles 1118 positioned on the outer surface of the inner housing 1104.

The majority of the kinetic energy in the high velocity stream of liquid is translated to rotational energy to rotate the inner housing 1104 at high RPM. The liquid falls by gravity to the water outlet 2104 of the plumbing fixture 2100. Liquid spray within the cavity of the outer housing 1102 may also be channeled to the water outlet 2104 by the configuration of the interior surface 1112 of the outer housing 1102 and the scupper 2204. High RPM rotation of the inner housing 1104 produces electric power with the permanent magnet generator included in the inner housing 1104. Power may be produced by the generator on the power supply line 1844. The power supply line 1844 may be routed through the passage in the centering rod 1106 and a conduit 2206 to the electronic module 2108.

The electronic module 2108 may include any electrical related circuitry and components for the plumbing fixture 2100. The electronic housing 2108 may include a valve controller 2226, an energy storage device 2228, a power controller 2230 and a sensor 2232. The valve controller 2226 may be part of the electrically operated valve 2202, and may be any device capable of actuating the opening and closing of the electrically operated valve 2202 using voltage and current. The valve controller 2226 may include an electric motor, a rotary actuator, a solenoid or any other device capable of moving a valve mechanism. In addition, the valve controller 2226 may include limit switches or any other form of position sensing device(s) to determine the position of the electrically operated valve 2202. The valve controller 2226 may be powered by the energy storage device 2228.

The energy storage device 2228 may be a battery and/or a capacitor and/or any other circuit or device(s) capable of storing energy in the form of voltage and current. The power controller 2230 is coupled with the valve controller 2226 and the energy storage device 2238. The power controller 2230 may be any circuit or device capable of monitoring a magnitude of voltage in the energy storage device 2228 and controlling operation of the electrically operated valve 2202.

During operation, the magnitude of voltage in the energy storage device 2228 is monitored by the power controller 2230. When the voltage falls below a determined threshold, the electrically operated valve 2202 may be activated to open by the power controller 2230. Power may be supplied from the energy storage device 2228 to the valve controller 2226 to actuate the electrically operated valve 2202. When the electrically operated valve 2202 is opened, pressurized liquid flows through the valve module 2106 to the nozzle 1108. The high velocity stream of pressurized liquid is directed by the nozzle 1108 at the inner housing 1104 to generate electric power. The electric power is used to re-charge the energy storage device 2228.

The sensor 2232 may also activate the electrically operated valve 2202. The sensor 2232 may be a motion sensor, a temperature sensor or any other form or sensing device capable of sensing one or more parameters in the environment around the plumbing fixture 2100. In this example, the sensor 2232 may be a motion sensor capable of sensing motion. In response to motion, the sensor 2232 may actuate the electrically operated valve 2202 to open using power from the energy storage device 2228. The energy storage device 2228 may subsequently be recharged by power from the generator in the power generation module 2110 resulting from the flow of liquid.

Figure 23:
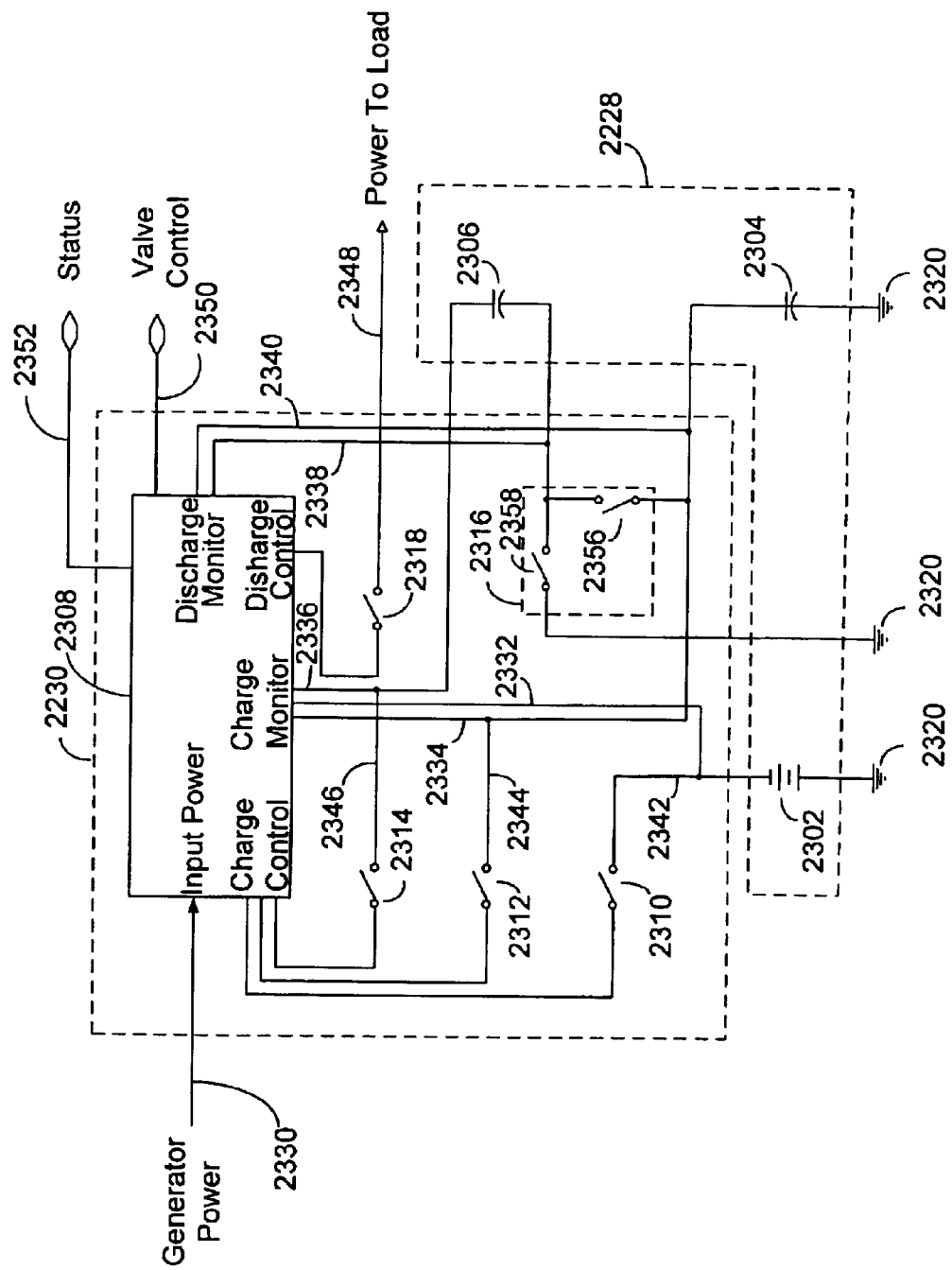
FIG. 23 represents a schematic diagram of an example of a power controller included in the plumbing fixture of FIG. 22.

FIG. 23 is a circuit diagram of an example of the energy storage device 2228 and the power controller 2230. The illustrated energy storage device 2228 includes a first energy storage device 2302, a second energy storage device 2304 and a third energy storage device 2306. The power controller 2230 includes a processor 2308, a first charging switch 2310, a second charging switch 2312, a third charging switch 2314, a series/parallel switch 2316 and a load control switch 2318. In other examples, fewer or greater numbers of energy storage devices and switches may be utilized.

The first, second and third energy storage devices 2302, 2304 and 2306 may be any device capable of storing electric power. In the illustrated example, the first energy storage device 2302 is a battery and the second and third energy storage devices 2304 and 2306 are capacitors to maximize discharge performance. The capacitors may be one or more electrolytic capacitors or electrochemical capacitors such as super capacitors and/or ultra capacitors. In other examples, batteries, capacitors, or any configuration of batteries and capacitors may be used. Each of the first and second energy storage devices 2302 and 2304 are electrically connected with a ground connection 2320. The third energy storage device 2306 may be electrically connected with the ground connection 2320 by the series/parallel switch 2316.

The processor 2308 may be any form of computing device capable of executing instructions to monitor inputs and providing outputs. Inputs to the processor 2308 include input power supplied from the generator in the power generation module 2110 (FIG. 21) on a power input line 2330. The power supplied by the generator may be three phase or single phase AC power that is rectified with one or more diodes to provide DC power to the processor 2308.

Other inputs to the processor 2308 include a first charge indication for the first energy storage device 2302 on a first charging line 2332 and a respective second and third charging indication for the respective second and third energy storage devices 2304 and 2306 on second and third respective charging lines 2334 and 2336. The charging lines 2332, 2334 and 2336 indicate to the processor 2308 the amount of the charge stored in the respective energy storage devices 2302, 2304 and 2306. In addition, in the illustrated example, a first discharge indication and a second discharge indication are provided as inputs to the processor 2308 on a first discharge line 2338 and a second discharge line 2340, respectively. The first discharge indication provides the amount of discharge of the capacitor that is the second energy storage device 2304. The amount of discharge of the capacitor that is the third energy storage device 2306 is provided by the second discharge indication.

Outputs from the processor 2308 include control signals to control operation of the first charging control switch 2310, the second charging control switch 2312 and the third charging control switch 2314. Energization of the first charging control switch 2310 may provide a first charging voltage to the first energy storage device 2302 on a first charging line 2342. A second charging voltage may be provided to the second energy storage device 2304 on a second charging line 2344 when the second charging control switch 2312 is closed. The third charging control switch 2314 may be energized to provide a third charging voltage to the third energy storage device 2306 on a third charging line 2346.

The processor 2308 may also provide output control signals to direct the load control switch 2318 to control the voltage on a load supply line 2348. The load supply line 2348 may provide power to a load. In this example, the load includes the electrically operated valve 2202 (FIG. 22) and the electronics included in the electronics module 2108 (FIG. 21). In other examples, any other load may be supplied from the load supply line 2348.

Power on the load supply line 2348 may be supplied by the processor 2308 from the generator in the power generation module 2110 and/or from the charge stored on one or more of the energy storage devices 2302, 2304 and 2306. For example, when the generator is producing power, the processor 2308 may provide that power directly to the load on the load supply line 2348. In addition, the processor 2308 may provide charging voltage(s) to charge one or more of the energy storage devices 2302, 2304 and 2306 with the power produced by the generator. Alternatively, when, for example, the generator is not producing power (or not producing enough power), the processor 2308 may provide power on the load supply line 2348 from the charge stored in one or more of the energy storage devices 2302, 2304 and 2306.

The processor 2308 may also provide a control output on a valve control line 2350 to control operation of the electrically operated valve 2202. Outputs from the processor 2308 on a status line 2352 may provide operational status. Operational status may include error indications, the state of the charge on the energy storage devices 2302, 2304 and 2306, the position of the electrically operated valve 2202 (FIG. 22), or any other operationally related indications or parameters. The status line 2352 may be coupled with any form of user interface, such as light emitting diode (LEDs), a display, an audible alarm, etc.

The series/parallel switch 2316 includes a series switch 2356 and a parallel switch 2358. The processor 2308 may provide outputs to direct operation of the series switch 2356 and the parallel switch 2358. The series switch 2356 and the parallel switch 2358 may configure the second and third energy storage devices 2304 and 2306 in a parallel configuration or a series configuration.

In the parallel configuration, a lower magnitude of discharge voltage may be supplied individually to the load by the second and third energy storage devices 2304 and 2306. In the series configuration a higher magnitude of discharge voltage may be supplied to the load by the combined discharge of the second and third energy storage devices 2304 and 2306. The processor 2308, the charging control switches 2310, 2312 and 2314, the series/parallel switch 2316 and the load control switch 2318 may be implemented with an application specific integrated circuit (ASIC). Alternatively, separate components, or separate groups of components may be utilized.

Instructions stored in memory may be executed by the processor 2308 to provide charge and discharge control of the first, second and third energy storage devices 2302, 2304 and 2306. Control with the processor 2308 may be based on determined threshold voltages, determined threshold charge levels and the input power supplied by the generator in the power generation module 2110. A first threshold voltage may be a magnitude of input voltage supplied from the generator and/or one or more of the energy storage device 2302, 2304 and 2306. A second threshold voltage may be an output voltage supplied on the load supply line 2348.

The determined threshold charge levels of each of the energy storage devices 2302, 2304 and 2306 may be a fully charged condition that may be determined based on the characteristics of the individual energy storage devices. First, second and third discharge level thresholds for each of the respective energy storage devices 2302, 2304 and 2306 may also be determined. Each of the discharge level thresholds may include a discharge limit and a discharge cutoff. The discharge limit may indicate depletion of the charge level to some level below the fully charged condition. The discharge cutoff may indicate depletion of the charge below a maximum desired level of charge depletion.

In addition, the processor 2308 may include timing capability to provide indication of the status of the energy storage devices 2302, 2304 and 2306. A charge timer may be activated by the processor 2308 to begin timing when one of the energy storage devices is being charged. Based on the charge indication(s) on the charging line(s) of the particular energy storage device(s) being charged, the timing of the charge timer may be used to determine a percentage of fully charged, a charging rate, etc. The charge related determinations may be provided on the status line 2352. Similarly, a discharge timer may be enabled by the processor 2308 to begin timing during a discharge cycle of each of the second and third energy storage devices 2304 and 2306. The discharge indications on the respective discharge lines 2338 and 2340 may be used by the discharge timer to indicate the percentage of discharge, the discharge rate, etc. of each of the second and third energy storage devices 2304 and 2306 on the status line 2352.

When the generator in the power generation module 2110 is producing power, the processor 2308 may selectively charge one or more of the energy storage devices 2302, 2304 and 2306. For example, when the flow of liquid is relatively high at a relatively high pressure, the generator may produce abundant amounts of power at a relatively high voltage. Under these conditions, the processor 2308 may enable the first charging switch 2310, the second charging switch 2312 and the third charging switch 2314 at the same time to charge all of the energy storage devices 2302, 2304 and 2306. Alternatively, when less or lower voltage power is produced, the processor 2308 may activate fewer than all of the first, second and third charging switches 2310, 2312 and 2314.

During operation, when the charge stored in one or more of the energy storage devices 2302, 2304 and 2306 is above the determined discharge limit, the load control switch 2318 may be enabled by the processor 2308 to supply power to the load. When the load consumes power and therefore discharges one or more of the energy storage devices 2302, 2304 and 2306 below the discharge limit, the processor 2308 may activate the electrically operated valve 2202 (FIG. 22) to open with a control signal on the valve control line 2350. As previously discussed, the flow of liquid through the plumbing fixture 2100 (FIG. 21) and the power generation module 2110 induces the production of power by the generator.

Upon sensing input power on the power input line 2330, the processor 2308 may activate one or more of the charging switches 2310, 2312 and 2314 to re-charge the respective energy storage devices 2302, 2304 and 2306. If the energy storage devices 2302, 2304 and 2306 continue to discharge to the cutoff limit, the load control switch 2318 may be disabled by the processor 2308. Upon loss of power to the load on the load supply line 2348, the electrically operated valve 2202 (FIG. 22) may remain open and the generator in the power generation module 2110 may continue to supply power. Alternatively, upon loss of power, the electrically operated valve 2202 may close, input power from the generator may cease and power from the energy storage devices 2302, 2304 and 2306 may be used by the processor 2308 to indicate an error on the status line 2352. The error may be indicated with an indicator such as a flashing light emitting diode (LED).

During discharge of power from one or more of the energy storage devices 2302, 2304 and 2306, the processor 2308 may selectively switch the series/parallel switch 2316 to maximize the discharge time. In addition, voltage on the load supply line 2348 may be maintained by selectively switching the series/parallel switch 2316 as the discharge occurs to maximize efficiency. Further, the processor 2308 may convert the magnitude of the output voltage to other voltage magnitudes with selective switching of the series/parallel switch 2316. For example, an input voltage from the generator of about 6 VDC may be converted to 3 VDC by the processor 2308. In another example, 1.5 VDC supplied from the generator may be converted by the processor 2308 to 6 VDC.

Figure 24:
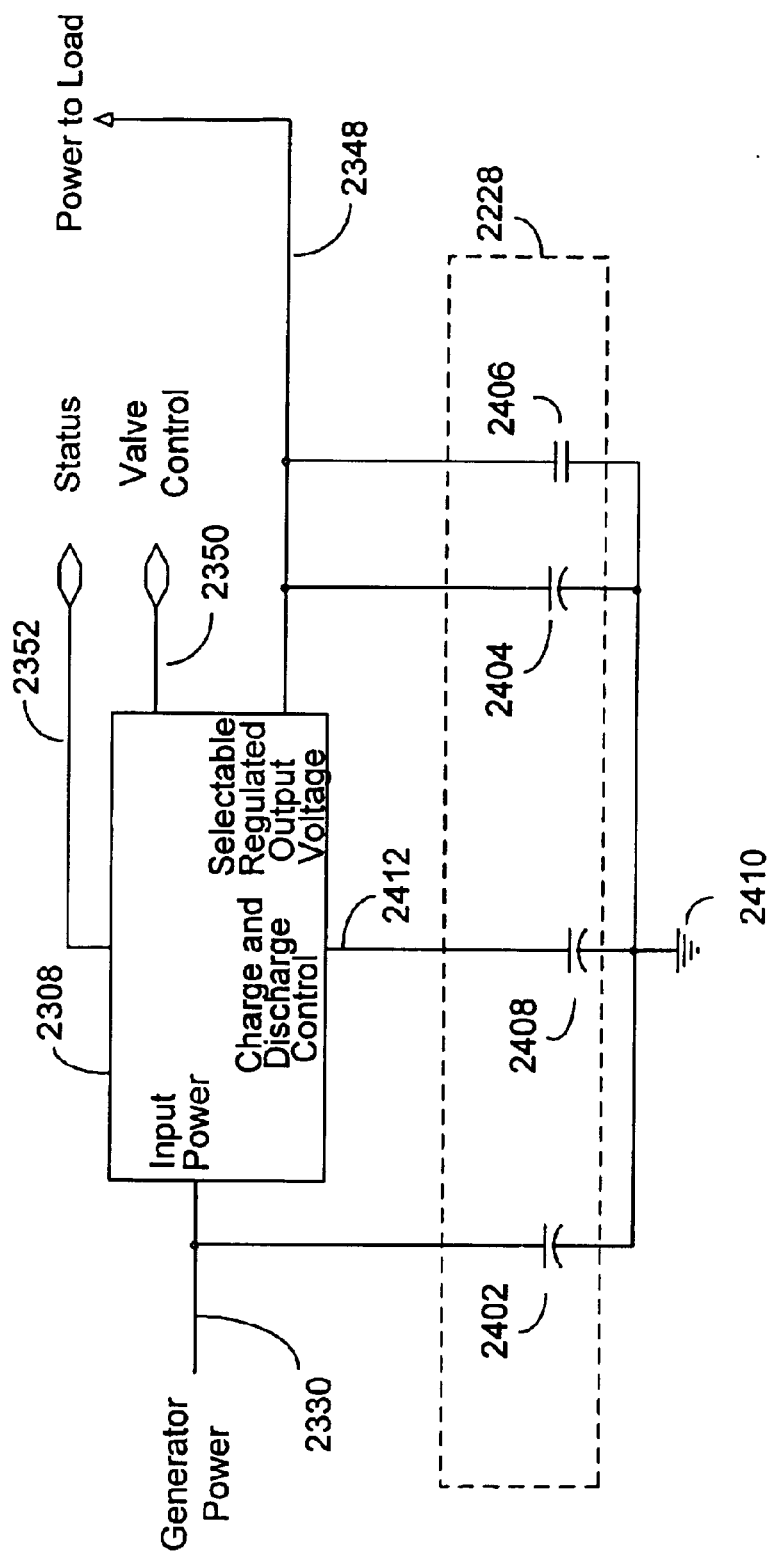
FIG. 24 represents a schematic diagram of another example of a power controller included in the plumbing fixture of FIG. 22.

FIG. 24 is another example circuit diagram of the energy storage device 2228 and the power controller 2230. In this example, the power controller 2230 includes the processor 2308. The energy storage device 2228 includes a plurality of energy storage devices comprising a first capacitor 2402, a second capacitor 2404, a third capacitor 2406 and a fourth capacitor 2408 electrically connected to a ground connection 2410. In other examples, other configurations and numbers of energy storage devices, such as a battery in place of the fourth capacitor 2408 may be used.

The processor 2308 may receive input power on the power input line 2330 from the generator in the power generation module 2110 (FIG. 21). The input power may also charge the first capacitor 2402. Thus, the processor 2308 may be provided with input power from the first capacitor 2402 when the generator stops producing power.

The processor 2308 may control the charge and discharge of the fourth capacitor 2408 with a charge control line 2412. Charging of the fourth capacitor 2408 may be with the power supplied on the power input line 2330. Discharge of the fourth capacitor 2408 may be based on the load being supplied with the load supply line 2348. The load may include the electrically operated valve 2202 (FIG. 22) and/or any other electronics in the electronics module 2108 (FIG. 21).

The processor 2308 may provide regulated output voltage to the load on the load supply line 2348. The power supplied on the load supply line 2348 may be from the generator, the first capacitor 2402 and/or the fourth capacitor 2408. The second and third capacitors 2404 and 2406 may provide noise suppression of any high frequency transients that may be present on the load supply line 2348.

Similar to the example of FIG. 23, the processor 2308 may sense depletion of the charge on the fourth capacitor 2408 below the discharge limit level and transmit a control signal on the valve control line 2350 to open the electrically operated valve 2202 (FIG. 22). The resulting flow of liquid may rotate the generator in the power generation module 2110 (FIG. 21) at high RPM to produce power on the power input line 2330. If the charge on the fourth capacitor 2408 becomes depleted to the discharge cutoff level, an error may be generated on the status line 2350, the electrically operated valve 2202 (FIG. 22) may be deenergized and power to the load may be discontinued.

Figure 25:
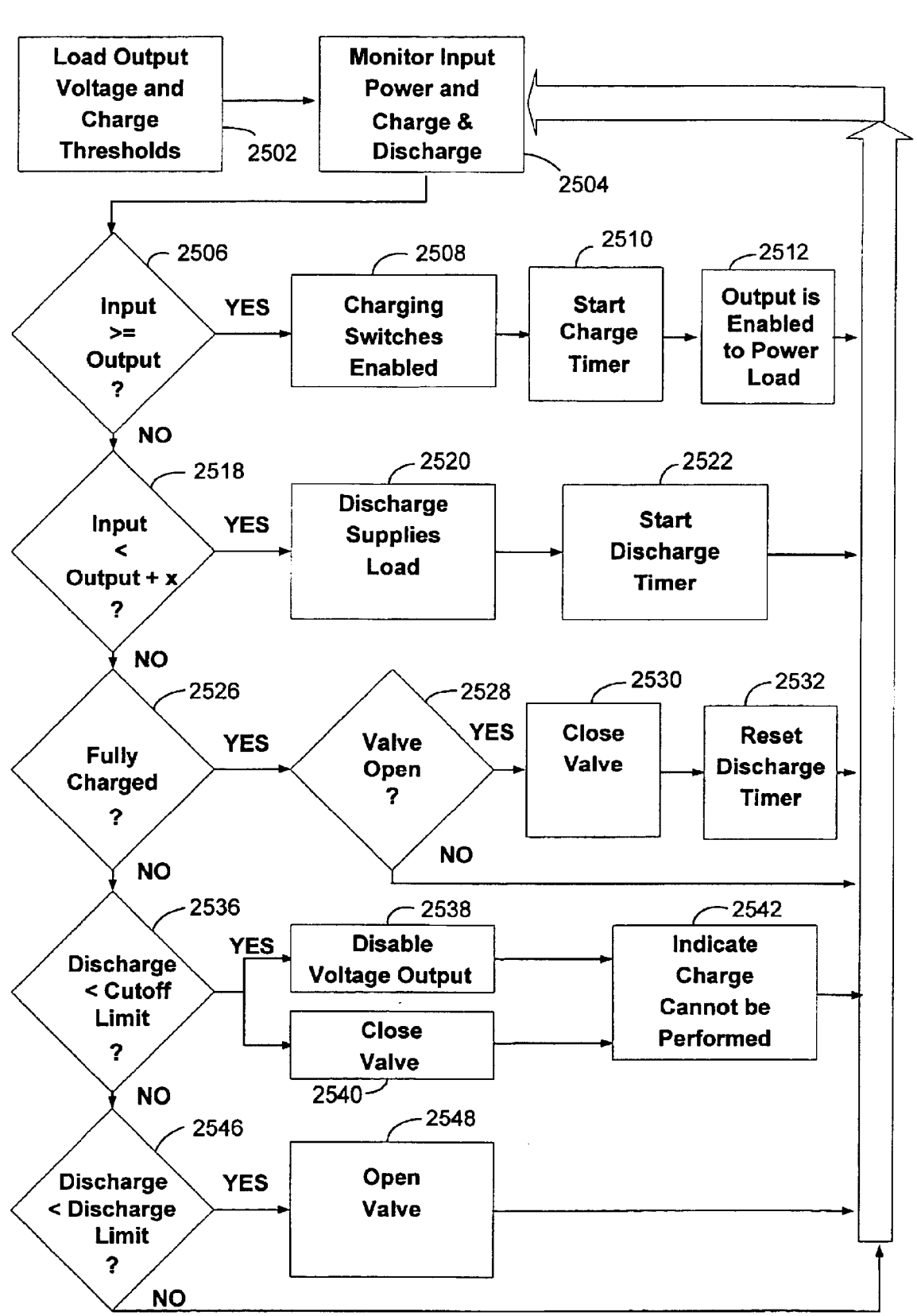
FIG. 25 is a process flow diagram illustrating operation of the hydro-power generation system within the plumbing fixture of FIGS. 21–24.

FIG. 25 is a process flow diagram illustrating example operation of the power controller 2230 of FIGS. 22–23. The operation begins at block 2502 when the desired output voltage to the load, the desired charge level and the desired discharge level thresholds (the discharge limit and the discharge cutoff) are established and stored in the processor 2308. The processor 2308 may execute instructions to monitor the supply voltage on the power input line 2330, and the charge and discharge voltages of the energy storage devices 2302, 2304 and 2306 at block 2504.

At block 2506, the processor 2308 determines if the magnitude of supply voltage is equal to or greater than the desired output voltage to the load. If the supply voltage is greater than the desired output voltage, the processor 2308 activates one or more of the charging switches 2310, 2312 and 2314 to enable the supply of power from the power input line 2330 to charge one or more of the energy storage devices 2302, 2304 and 2306 at block 2508. At block 2510, the processor 2308 may activate one or more charge timers to monitor charging of the energy storage device(s) 2310, 2312 and 2314. In addition, at block 2512, the processor 2308 may enable the supply of power from the input power line 2330 to the load on the load supply line 2348. The operation then returns to block 2504 to continue monitoring the voltages and charges.

If at block 2506, the supply voltage is not greater than or equal to the desired output voltage, the processor 2308 determines if the supply voltage on the input power line 2330 is less than the desired output voltage by a determined amount (x) at block 2518. If the supply voltage is less than the desired output voltage by at least the determined amount (x), the processor 2308 enables one or more of the energy storage devices 2302, 2304 and 2306 to begin discharging stored charge on the stored power lines 2332, 2334 and 2336 at block 2520. The processor 2308 may provide the stored charge as output voltage and current on the load supply line 2348 to supply the load. At block 2522, the processor 2308 may enable a discharge timer to monitor the discharge of power from each of the energy storage devices 2302, 2304 and 2306. The operation then returns to block 2504 to continue monitoring the voltages and charges.

If the supply voltage is not less than the desired output voltage at block 2518, the processor 2308 determines if all of the energy storage devices 2302, 2304 and 2306 are fully charged at block 2526. If all of the energy storage devices 2302, 2304 and 2306 are fully charged, the processor 2308 determines if the electrically operated valve 2202 is open at block 2528. If the electrically operated valve 2202 is not open, the operation returns to block 2504 and monitors the voltages. If the electrically operated valve 2202 is open, the processor 2308 sends a signal on the valve control line 2350 to close the electrically operated valve 2202 at block 2530. The generator in the power generation module 2110 stops producing electric power when the electrically operated valve 2202 is closed.

At block 2532, the discharge timer(s) is reset and the operation returns to block 2504 to monitor the voltages and charges. If the energy storage devices 2302, 2304 and 2306 are not all fully charged at block 2526, the processor 2308 determines if any of the energy storage devices 2302, 2304 and 2306 are discharged to less than the discharge cutoff at block 2536. If the energy storage devices 2302, 2304 and 2306 are discharged to less than the discharge cutoff, the processor 2308 disables the supply of output power on the output power line 2348 at block 2538. In addition, the processor 2308 sends a signal on the valve control line 2350 to close the electrically operated valve 2202 at block 2540. At block 2542, the processor 2308 provides indication on the status line 2352 that charging of the energy storage devices 2302, 2304 and 2306 cannot be performed. The operation then returns to block 2504 to monitor for the voltages and charges.

If at block 2536 none of the energy storage devices 2302, 2304 and 2306 are discharged to less than the discharge cutoff, the processor 2308 determines if any of the energy storage devices 2302, 2304 and 2306 are discharged to less than the discharge limit at block 2546. If any of the energy storage devices 2302, 2304 or 2306 are discharged to less than the discharge limit, the processor 2308 sends a control signal on the valve control line 2350 to open the electrically operated valve 2202 at block 2548. When the electrically operated valve 2202 is opened, the generator in the power generation module 2110 produces power on the power input line 2330. The operation returns to block 2504 to charge the energy storage devices 2302, 2304 and 2306 and supply power to the load from the generator. If at block 2546, none of the energy storage devices 2302, 2304 and 2306 are discharged to less than the discharge limit, the operation returns to block 2504 and monitors the voltages and charges.

In another example, similar to FIG. 21, the hydro-power generation system may include a plumbing fixture that is a faucet system. The faucet system may include the valve module 2106, the electronics module 2108 and the power generation module 2110. The generator in the power generation module 2110 may charge at least one energy storage device in the electronics module 2108. The power controller included in the electronics module 2108 may allow direct charging until the energy storage device(s) is charged. This will allow the faucet system to use stored power beyond the period of time that liquid is flowing through the faucet system. In addition, a simple manual momentary on push button can cause a flow of liquid to rotate the generator within the power generation module 2110 to re-charge the energy storage device(s) if the faucet system is not used for extended periods.

In yet another example, the hydro-power generation system may include a plumbing fixture that is a shower head. The shower head may include a radio and/or other water-proofed electronics. The radio may be waterproof and include AM, FM, compact disc or any other entertainment device. The hydro-power generation system may include features similar to the system illustrated in FIGS. 9 and 10. The generator resulting from the turbine spinning within the stator may be a power source for charging a capacitor, super capacitor or ultracapacitor. This provides a power source for the electronics that requires no maintenance cycle to replace the power source such as when the power source is a battery. The shower head may also include a shower timer with an alarm and pre-warning indicator to keep the shower timed. The alarm may be used to keep the length of the shower to a determined period of time. Further, the shower head may include a clock with a display that is lighted when the shower is running. During periods of no liquid flow, the clock may operate from the energy storage device without lighting to conserve power.

Figure 26:
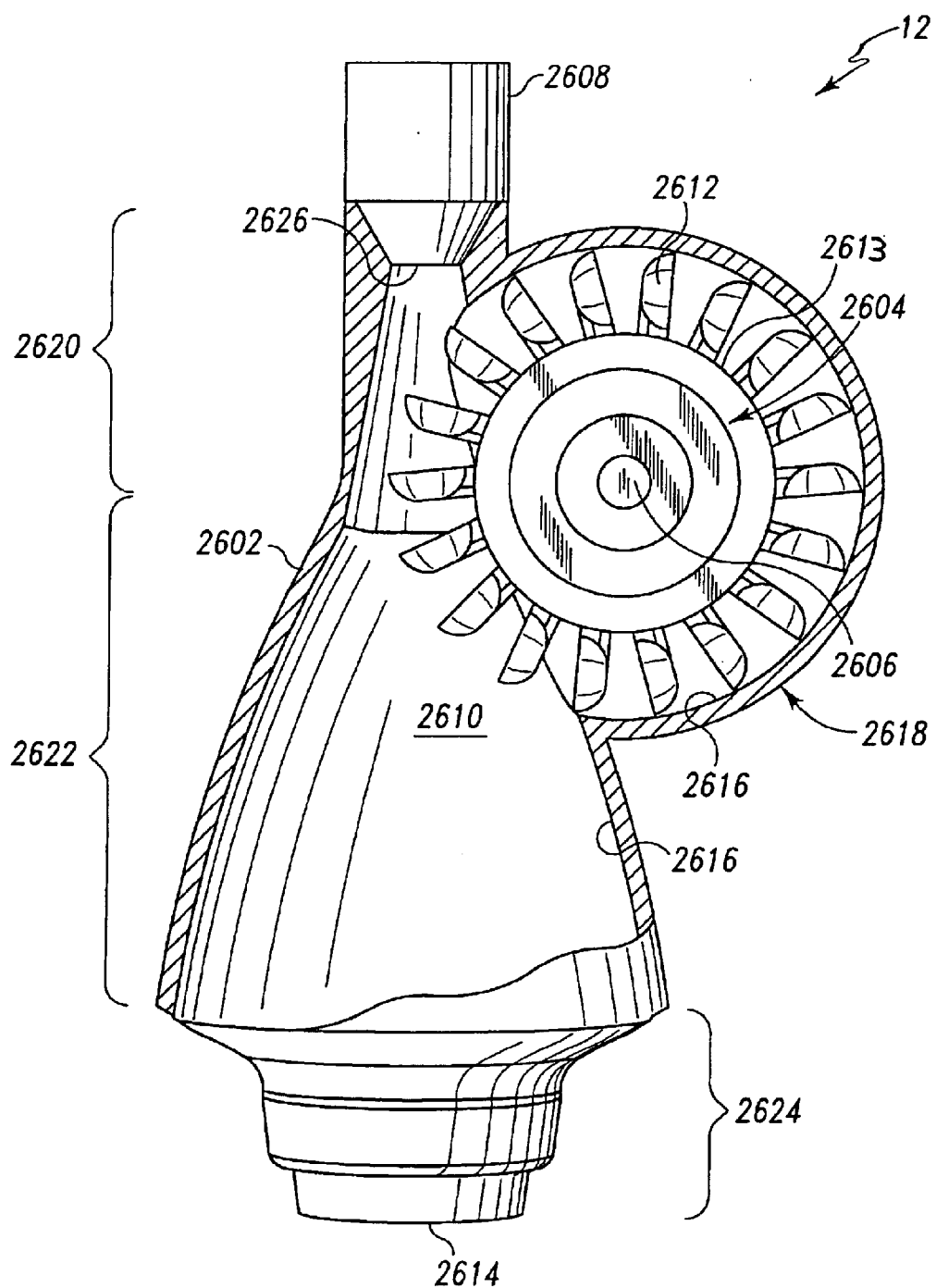
FIG. 26 represents a partially cross-sectioned side view of another embodiment of the hydro-power generation system.

FIG. 26 illustrates yet another example of the hydro-power generation system 12 that includes an outer housing 2602, an inner housing 2604, a centering rod 2606 and a nozzle 2608. The inner housing 2604 is positioned in a cavity 2610 formed within the outer housing 2602 and includes a plurality of paddles 2612 positioned on an outer surface 2613 of the inner housing 2604. The outer housing 2602 includes an outlet 2614 and an interior wall 2616. The features of the hydro-power generation system 12 illustrated in FIG. 26 are similar in many respects to the previously discussed examples of the hydro-power generation system. Thus, for purposes of brevity, the following discussion will focus on differences with the previously discussed examples.

In the illustrated example, the outer housing 2602 includes an inner housing section 2618, a nozzle section 2620, a drain section 2622 and a flow collection section 2624. The inner housing section 2618 is formed to adjacently surround a portion of the inner housing 2604. The paddles 2612 are positioned adjacent to the interior wall 2616 of the inner housing section 2618 to minimize liquid impedance. As in the previous examples, the interior wall 2616 within the inner housing section 2618 may include ducting (not shown) to channel liquid toward the outlet 2614.

The nozzle section 2620 forms the top of the outer housing 2602 and is configured to receive the nozzle 2608. The nozzle 2608 is positioned to penetrate the outer housing 2602 and direct a substantially vertical stream of liquid at the paddles 2612 of the inner housing 2604. The substantially vertical stream of liquid may be discharged from a nozzle outlet 2626 of the nozzle 2608 in a well-defined substantially laminar stream at relatively high velocity. The stream of liquid may substantially maintain the diameter of the nozzle outlet 2626 following discharge. Liquid spray may therefore be minimized and the kinetic energy in the stream of liquid may be focused in a relatively small area.

Figure 27:
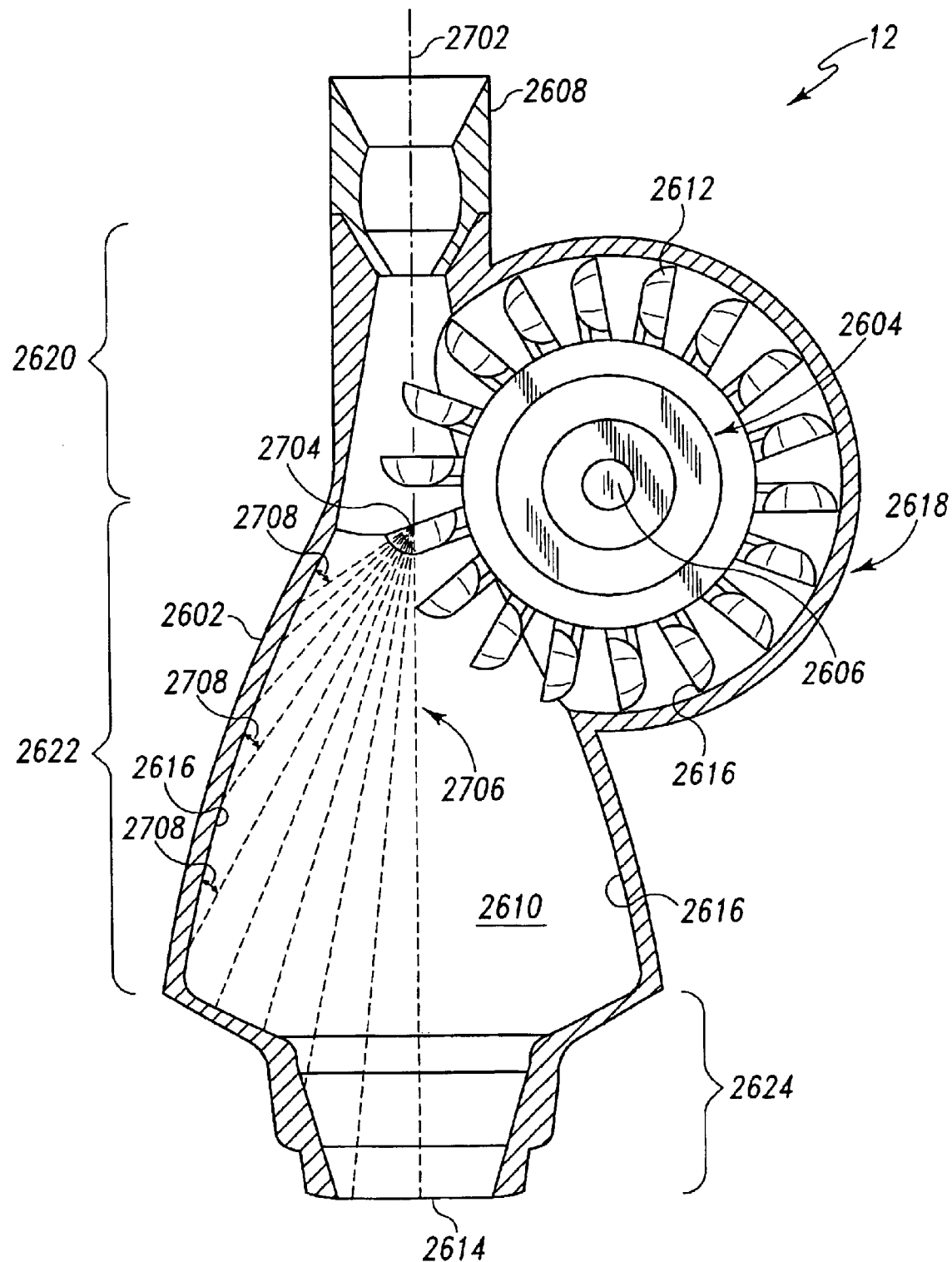
FIG. 27 represents another cross-sectional side view of the hydro-power generation system of FIG. 26.

FIG. 27 is a cutaway side view of the hydro-power generation system 12 that includes the outer housing 2602, the inner housing 2604, the centering rod 2606 and the nozzle 2608. The inner housing 2604 includes the paddles 2612. The outer housing 2602 includes the inner housing section 2618, the nozzle section 2620, the drain section 2622 and the flow collection section 2624.

Following impact of the stream of liquid with the paddles 2612, the stream of liquid may enter the drain section 2622. Due to the impact, the liquid may become a dispersed stream of liquid with a diameter that is larger than the diameter of the nozzle outlet 2624. In addition, liquid spray may be produced by the impact as well as the rotation of the inner housing 2604. The diameter (or spray pattern) of the dispersed stream of liquid may depend on the velocity of the stream of liquid and the amount of electrical load on the generator. When there is little load on the generator, the inner housing 2604 may rotate relatively freely. Thus, the amount of dispersion of the dispersed stream of liquid is relatively small such as for example a dispersion angle of 30 degrees with respect to a central axis 2702 coaxial with the stream of liquid discharged from the nozzle 2608. Conversely, when a large load is present, significant force is required to maintain rotation of the inner housing 2604 and dispersion of the dispersed stream of liquid may result in a dispersion angle as large as 90 degrees with respect to the central axis 2702. Whatever the load, the collision of the liquid with the paddles 2612 may create liquid spray and a dispersed stream of liquid. For purposes of discussion, the dispersion angle of the dispersed stream of liquid is assumed to be about 45 degrees. In other examples, larger or smaller dispersion angles may be used.

Also illustrated in FIG. 27 is an impact point 2704 and a plurality of the trajectory vectors 2706. The impact point 2704 may be the area where the well-defined substantially linear stream of liquid discharged by the nozzle 2608 collides with the paddles 2612. The trajectory vectors 2706 illustrate the paths of the liquid following impact with the paddles 2612 based on the dispersion angle. Liquid following those trajectory vectors 2706 that are closer to the central axis 2702 may directly enter the collector section 2624 and be channeled to the outlet 2614.

Liquid in the trajectories 2706 further away from the central axis 2702, however collide with the interior surface 2616 within the drain section 2622. This liquid is efficiently channeled to the outlet 2614 to minimize fluid impedance. In addition, liquid spray resulting from the collision with the interior surface 2616 is minimized. In the drain section 2622, the interior surface 2616 is configured in a predetermined shape to efficiently channel the liquid to the outlet 2614 and minimize liquid spray. Thus, the previously discussed ducting in the interior surface 2616 is unnecessary. Instead, the interior surface in the second segment 2710 may remain substantially flat and be shaped to act as a reflector and efficiently evacuate liquid from the outer housing 2602 and minimize liquid impedance. Accordingly, the cavity 2610 may be maintained substantially dry with liquid flow rates in a range of about 0.44 liters/minute to about 4.16 liters/minute.

As further illustrated in FIG. 27, the interior surface 2616 within the drain section 2622 may be configured with a predetermined shape. The predetermined shape may be based on a trajectory flow angle 2708 that is formed between each of the trajectory vectors 2706 and the interior surface 2616 within the drain section 2622. The trajectory flow angle 2708 is defined as the angle at the intersection of the interior surface 2616 and the trajectory vectors 2706 followed by the dispersed stream of liquid and liquid spray resulting from impact with the paddles 2612. The shape of the interior surface 2616 may be designed to maintain the trajectory flow angle 2708 followed by the dispersed stream of liquid at less than about twenty degrees. The trajectory flow angle 2708 may vary by plus and minus five degrees based on manufacturing tolerances and/or physical properties associated with the liquid.

The shape of the interior surface 2616 of the second segment 2710 in the illustrated example is configured as a generally cone-shaped rocket nozzle. The shape of the interior surface may be based on modeling or analysis of the behavior of the dispersed stream of liquid resulting from impact with the rotating paddles 2612. By maintaining the trajectory flow angle 2708 followed by the dispersed stream of liquid within about twenty degrees of the interior surface 2616, the liquid may remain in a more organized state with less non-laminar flow.

The more organized state may allow for relatively faster evacuation of the cavity 2610. Thus, the overall size of the outer housing 2602 may be minimized while still maintaining the inner and outer housings 2602 and 2604 substantially dry when liquid is being discharged from the nozzle 2608. In addition, the flow of liquid out of the outlet 2614 may have some magnitude of velocity due to the similarity of the shape of the interior surface and the trajectory vectors 2706. Further, the more organized state of the flowing liquid may minimize liquid spray, and turbulent flow, thus minimizing fluid impedance and maximizing the transfer of kinetic energy to rotational energy.

The shape of the drain section 2622 of the outer housing 2602 may also be implemented on the previously discussed examples of the hydro-power generation system. For example, referring to the hydro-power generation system 12 of FIG. 11, the outer housing 1102 may be rotated ninety degrees such that the nozzle 1108 discharges a stream of fluid vertically. In addition, the outlet 1114 may be moved to the wall of the outer housing 1102 that is opposite the nozzle 1108 and the outer housing may be re-shaped to achieve trajectory flow angles for the trajectory vectors of about twenty degrees or less. In the example hydro-power generation system of FIG. 21, the outer housing 1102 upstream of the outlet 2104 of the plumbing fixture 2100 may simply be re-shaped to achieve trajectory flow angle for the trajectory vectors of about twenty degrees or less.

The present preferred embodiments of the hydro-power generation system provide a stand alone source of electricity that may also include other functionality such as plumbing fixtures or water treatment. The hydro-power generation system provides efficient conversion of the energy present in flowing water to electric power. The electric power may be used to supply power to electronics and other device(s) within the hydro-power generation system. In addition, the electric power may supply other independent systems such as a water treatment system. As those skilled in the art would recognize application of the hydro-power generation system is not limited to water and could be advantageously applied for other liquids.

While the present invention has been described with reference to specific exemplary embodiments, it will be evident that various modifications and changes may be made to these embodiments without departing from the spirit and scope of the invention. It is the following claims, including all equivalents, which are intended to define the spirit and scope of the invention.

What is claimed is:

1. A hydro-power generation system, comprising:
   a centering rod;
   a bushing positioned to surround the centering rod;
   a housing coupled with the bushing, wherein the housing and the bushing are rotatable around the centering rod;
   a plurality of paddles coupled with an outer surface of the housing, wherein the paddles are generally concaved and longitudinally extend outward from the outer surface of housing perpendicular to the centering rod; and
   a permanent magnet generator enclosed within the housing, the permanent magnet generator comprising a stator coupled with the centering rod and a rotor coupled with an interior surface of the housing,
   wherein the rotor and stator cooperatively operate to maintain the position of the bushing surrounding the centering rod without substantial contact between the bushing and the centering rod, wherein the bushings are disposed at opposed ends of the housing and comprise an aperture to accommodate the centering rod and an outer surface formed to fit within an aperture in the outer surface of the housing.

2. The hydro-power generation system of claim 1, wherein the rotor comprises a permanent magnet that is configured to spin balance rotation of the housing.

3. The hydro-power generation system of claim 1, wherein the rotor comprises a permanent magnet having a magnetic field configured to suspend the rotor in axial alignment with the stator.

4. The hydro-power generation system of claim 1, further comprising an outer housing surrounding the housing, wherein the centering rod extends through opposed ends of the housing and is non-rotatably coupled with the outer housing.

5. The hydro-power generation system of claim 1, wherein the housing is generally cylindrical with a diameter between about 40 millimeters and about 20 millimeters and is configured to rotate above about 5000 revolutions-per-minute.

6. The hydro-power generation system of claim 1, wherein each of the bushings comprise a sleeve having an aperture formed to accommodate the centering rod.

7. The hydro-power generation system of claim 1, further comprising an ultraviolet light source coupled with the permanent magnet generator, wherein the stator comprises a plurality of coils configured to be dynamically switchable between a parallel configuration and a series configuration to provide a first voltage for initial energization of the ultraviolet light source and a second voltage for continued energization of the ultraviolet light source.

8. The hydro-power generation system of claim 7, wherein the ultraviolet light source is one of a mercury lamp and a cold cathode lamp that is initially energized and continued to be energized without a ballast.

9. A hydro-power generation system, comprising:
   an outer housing;
   an inner housing positioned to be completely enclosed by the outer housing, the inner housing comprising a plurality of paddles configured to longitudinally extend outwardly from an outer surface of the inner housing toward the outer housing;
   a centering rod fixedly coupled with the outer housing and extending through the inner housing, the inner housing rotatable within the outer housing around the centering rod;
   an electrical generator disposed within the inner housing, wherein the electrical generator comprises a rotor and a stator, the stator is coupled with the centering rod and the rotor is coupled with an interior surface of the inner housing and rotates around the stator as the inner housing rotates;
   a nozzle penetrating the outer housing, wherein the nozzle is configured to direct a stream of liquid at the paddles to induce rotation of the inner housing; and
   an interior surface of the outer housing comprising ducting configured to minimize liquid spray within the outer housing.

10. The hydro-power generation system of claim 9, wherein the ducting comprises a plurality of fingers positioned in a swirl pattern that is formed to efficiently collect liquid spray within the outer housing.

11. The hydro-power generation system of claim 10, wherein the fingers are each formed as pyramid shaped members that extend outward from the interior surface of the outer housing toward the inner housing.

12. The hydro-power generation system of claim 9, wherein the ducting comprises a center channel, an outer channel, and a plurality of branch channels formed in a swirl pattern in the interior surface, wherein the swirl pattern is formed based on a pattern of liquid flung from the inner housing when the inner housing is rotated.

13. The hydro-power generation system of claim 9, wherein the ducting comprises a plurality of channels and a plurality of fingers, the fingers positioned along the channels to efficiently collect liquid spray and direct the liquid out of the outer housing via the channels.

14. The hydro-power generation system of claim 9, wherein the rotation of the inner housing may be monitored to provide flow based measurements of the stream of liquid.

15. The hydro-power generation system of claim 9, wherein the nozzle is positioned to penetrate the outer housing between the inner housing and an outlet included in the outer housing and provide the stream of liquid with substantially the same diameter as the diameter of an outlet of the nozzle.

16. The hydro-power generation system of claim 9, wherein the nozzle is configured to be positioned to penetrate the outer housing to discharge a vertical stream of liquid toward an outlet included in the outer housing.

17. The hydro-power generation system of claim 9, wherein the ducting is configured to channel liquid out of the outer housing so that the nozzle and the inner housing are not submerged in liquid discharged from the nozzle and remain in an airspace within the outer housing.

18. The hydro-power generation system of claim 9, further comprising a an ultraviolet light source electrically coupled with the electrical generator, wherein the stator comprises a plurality of taps that are configured to be dynamically switchable between a startup voltage to initially energize the ultraviolet light source and a running state voltage to continue to energize the ultraviolet light source.

19. The hydro-power generation system of claim 18, wherein the ultraviolet light source is initially energize and continues to be energized without a ballast.

20. The hydro-power generation system of claim 18, wherein the ultraviolet light source is one of a mercury lamp and a cold cathode lamp.

21. The hydro-power generation system of claim 9, wherein the outer housing comprises a drain section with an interior surface shaped to receive liquid at a flow trajectory angle of about twenty degrees or less, wherein the liquid received by the drain section has previously collided with the paddles.

22. A hydro-power generation system, comprising:
an inner housing comprising a plurality of paddles configured to longitudinally extend outwardly from an outer surface of the inner housing;
a centering rod non-rotatably extending through the inner housing, the inner housing rotatable around the centering rod;
an electrical generator disposed within the inner housing, wherein the electrical generator comprises a rotor and a stator, the stator is coupled with the centering rod and the rotor is coupled with an interior surface of the inner housing and rotates around the stator as the inner housing rotates;
a nozzle configured to direct a stream of liquid at the paddles to induce rotation of the inner housing; and
an outer housing non-rotatably coupled with the centering rod, wherein the outer housing is formed with a cavity to surround the inner housing and comprises a drain section configured to receive liquid after impact with the paddles, wherein the drain section is shaped to receive the liquid at a determined flow trajectory angle to minimize fluid impedance, wherein the flow trajectory angle is about twenty degrees or less.

23. The hydro-power generation system of claim 22, wherein the drain section formed in the shape of a generally cone-shaped rocket nozzle.

24. The hydro-power generation system of claim 22, wherein the outer housing comprises a nozzle section forming the top of the outer housing that is configured to receive a vertically positioned nozzle and an inner housing section configured to partially surround the inner housing to minimize fluid impedance.

25. The hydro-power generation system of claim 22, wherein the inner housing rotates at above about 5000 revolutions-per-minute in the cavity and the drain section is configured to evacuate liquid flowing at between about 0.44 liters/minute and about 4.16 liters/minute to maintain the cavity substantially dry.

26. A hydro-power generation system comprising:
a plumbing fixture;
a housing rotatable disposed in the plumbing fixture, the housing comprising a plurality of paddles that are generally concaved and positioned to extend outwardly from an outer surface of the housing;
an electrical generator disposed within the housing, wherein the electrical generator comprises a rotor coupled with an interior surface of the housing and a stator fixedly positioned in the housing, wherein the rotor rotates around the stator to produce electric power as the housing rotates;
a nozzle disposed in the plumbing fixture, the nozzle configured to direct a stream of liquid at the paddles to induce rotation of the housing;
an electrically operated valve disposed in the plumbing fixture, wherein the electrically operated valve is configured to supply a flow of liquid to the nozzle;
an energy storage device coupled with the electrical generator and the electrically operated valve; and
a voltage controller coupled with the electrically operated valve and the energy storage device, wherein the voltage controller is configured to direct the electrically operated valve to open when the voltage in the energy storage device is below a determined threshold level.

27. The hydro-power generation system of claim 26, wherein the housing rotates at above about 5000 revolutions-per-minute in response to a flow of liquid striking the paddles in a range between 0.44 liters per minute and 4.16 liters per minute.

28. The hydro-power generation system of claim 26, wherein the housing comprises a first hub and a second hub configured to be coupled together to maintain the paddles in position on the outer surface and concentrically surround the electrical generator.

29. The hydro-power generation system of claim 26, wherein liquid flowing through the nozzle in a range of between about 0.44 liters per minute and about 4.16 liters per minute results in production of electric power in a range of about 0.25 watts to about 30 watts.

30. The hydro-power generation system of claim 26, wherein the housing comprises a plurality of vents positioned concentrically around the outer surface to evacuate liquid from the housing as the housing is rotated so that the electrical generator operates substantially dry.

31. The hydro-power generation system of claim 26, wherein the plumbing fixture is a lavatory fixture.

32. A method of generating power with a hydro-power generation system, the method comprising:
accelerating the velocity of a stream of liquid with only one nozzle;
discharging the stream of liquid out of the nozzle through an airspace to strike a plurality of paddles, wherein the paddles are generally concaved and extend outward perpendicular to an outer surface of a housing;
transferring kinetic energy in the stream of liquid to rotational energy of the housing;
inducing rotation of the housing and a permanent magnet coupled with an interior surface of the housing with the stream of liquid;
rotating the permanent magnet around a stator non-rotatably positioned in the housing; and
generating electric power with the rotor and stator further comprising:
channeling liquid away from the housing to avoid submerging either of the housing and the nozzle in liquid so that the housing and the nozzle are maintained substantially dry.

33. The method of claim 32, further comprising rotating the housing at about 5000 revolutions-per-minute or above with kinetic energy provided by between about 0.44 liters/minute and 4.16 liters/minute of flowing liquid.

34. The method of claim 32, further comprising evacuating liquid from out of the housing with a plurality of vents disposed in the surface of the housing so that the rotor and stator are substantially dry.

35. The method of claim 32, further comprising maintaining the paddles in an unbroken concentric ring on the outer surface of the housing with contiguously positioned paddles and compression of the paddles between a first hub and a second hub that form the housing.

36. The method of claim 32, further comprising suspending the rotor in axial alignment with the stator with a magnetic field produced by the permanent magnet.

37. The method of claim 32, further comprising maintaining both the housing and an outer housing in which the housing is confined substantially dry as liquid is sprayed by the nozzle.

38. The method of claim 32, further comprising shaping the interior surface of a drain section included in the outer housing to intercept liquid that has collided with the paddles, wherein the interior surface of the drain section is configured to receive the liquid at a flow trajectory angle of about 20 degrees or less.

39. The method of claim 32, further comprising capturing liquid spray external to the housing to minimize liquid impedance, wherein the liquid spray is captured with a plurality of pyramid shaped members included on an interior surface of an outer housing that surrounds the housing.

* * * * *

UNITED STATES PATENT AND TRADEMARK OFFICE
CERTIFICATE OF CORRECTION

PATENT NO. : 6,885,114 B2
DATED : April 26, 2005
INVENTOR(S) : David W. Baarman et al.

It is certified that error appears in the above-identified patent and that said Letters Patent is hereby corrected as shown below:

<u>Title page,</u>
Item [60], Related U.S. Application Data, please add:
-- Provisional application No. 60/157,760, filed on October 5, 1999. --

Signed and Sealed this

Twenty-eighth Day of June, 2005

JON W. DUDAS
*Director of the United States Patent and Trademark Office*